US011414327B2

(12) United States Patent
Lam et al.

(10) Patent No.: US 11,414,327 B2
(45) Date of Patent: Aug. 16, 2022

(54) SONICATION FOR SEPARATION OF MATERIALS IN FLUIDS

(71) Applicants: Chevron U.S.A. Inc., San Ramon, CA (US); Arizona Board Of Regents On Behalf Of Arizona State University, Scottsdale, AZ (US)

(72) Inventors: Carl W. Lam, San Ramon, CA (US); Hong Luo, Houston, TX (US); Yuanming Guo, Tempe, AZ (US); Emmy Pruitt, Tempe, AZ (US); Paul Dahlen, Tempe, AZ (US)

(73) Assignees: CHEVRON U.S.A. INC., San Ramon, CA (US); ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 0 days.

(21) Appl. No.: 16/901,482

(22) Filed: Jun. 15, 2020

(65) Prior Publication Data
US 2021/0387870 A1 Dec. 16, 2021

(51) Int. Cl.
C02F 1/36 (2006.01)
B01D 17/02 (2006.01)
B01D 17/12 (2006.01)
B01D 21/28 (2006.01)
C02F 1/00 (2006.01)
C02F 1/40 (2006.01)
B01D 17/04 (2006.01)
(Continued)

(52) U.S. Cl.
CPC ............ *C02F 1/36* (2013.01); *B01D 17/0214* (2013.01); *B01D 17/04* (2013.01); *B01D 17/12* (2013.01); *B01D 21/283* (2013.01); *C02F 1/008* (2013.01); *C02F 1/40* (2013.01); *C02F 2101/32* (2013.01); *C02F 2103/10* (2013.01)

(58) Field of Classification Search
CPC .......... C02F 1/36; C02F 1/40; B01D 17/0214; B01D 17/04; B01D 17/12; B01D 21/283
USPC ....................... 210/748.02, 748.05
See application file for complete search history.

(56) References Cited

U.S. PATENT DOCUMENTS 4,316,734 A   2/1982  Spinosa et al.
5,322,082 A   6/1994  Shibano
(Continued)

FOREIGN PATENT DOCUMENTS

WO   2018014174   1/2018

OTHER PUBLICATIONS

Feng et al., "Sonochemical treatment of simulated soil contaminated with diesel", Advances in Environmental Research 4, 2000, pp. 103-112.
(Continued)

*Primary Examiner* — Christopher Upton
(74) *Attorney, Agent, or Firm* — King & Spalding LLP

(57) ABSTRACT

A system can include a multi-material fluid having a mixture of a first material and a second material. The system can also include a first vessel into which the multi-material fluid is disposed. The system can further include a first sonication device disposed, at least in part, in the multi-material fluid in the first vessel. The first sonication device, when operating, can emit ultrasound waves into the multi-material fluid. The ultrasound waves separate the first material and the second material from each other in the first vessel.

20 Claims, 12 Drawing Sheets

(51) Int. Cl.
  *C02F 101/32* (2006.01)
  *C02F 103/10* (2006.01)

(56) References Cited

U.S. PATENT DOCUMENTS

| | | | | |
|---|---|---|---|---|
| 5,951,456 | A * | 9/1999 | Scott | B01D 17/04 |
| | | | | 210/748.02 |
| 7,285,209 | B2 | 10/2007 | Yu et al. | |
| 7,708,895 | B2 | 5/2010 | Gou et al. | |
| 7,736,521 | B2 * | 6/2010 | Sloan | E21B 43/34 |
| | | | | 210/748.02 |
| 2002/0185445 | A1 * | 12/2002 | Varadaraj | C10G 33/00 |
| | | | | 210/748.02 |
| 2005/0271559 | A1 * | 12/2005 | Ratcliff | B01D 21/283 |
| | | | | 422/128 |
| 2006/0101919 | A1 | 5/2006 | Gunnerman et al. | |
| 2011/0284475 | A1 * | 11/2011 | Kolodny | C02F 1/36 |
| | | | | 210/748.02 |
| 2012/0145633 | A1 | 6/2012 | Polizzotti et al. | |

OTHER PUBLICATIONS

Na et al, "Effect of Ultrasound on Surfactant-Aided Soil Washing", Japanese Journal of Applied Physics, vol. 46, No. 7B, 2007, pp. 4775-4778.

Pilli et al., "Ultrasonic pretreatment of sludge: A review", Ultrasonics Sonochemistry 18 (2011) pp. 1-18.

Ning et al., "Effects of ultrasound on oily sludge deoiling", Journal of Hazardous Materials 171 (2009) pp. 914-917.

Yang et al, "Demulsification of Crude Oil Emulsion via Ultrasonic Chemical Method", Petroleum Science and Technology, 27: pp. 2010-2020, 2009.

Ye et al., "Application of ultrasound on crude oil pretreatment", Chemical Engineering and Processing 47 (2008) pp. 2346-2350.

Zhang et al., "Oil recovery from refinery oily sludge via ultrasound and freeze/thaw", Journal of Hazardous Materials 203-204 (2012) pp. 195-203.

Abramov et al., "Extraction of bitumen, crude oil and its products from tar sand and contaminated sandy soil under effect of ultrasound", Ultrasonics Sonochemistry 16 (2009) pp. 408-416.

Canselier et al., "Ultrasound Emulsification—An Overview", 1. Dispersion Science and Technology, 23(1-3), pp. 333-349 (2002).

Hu et al., "Recent development in the treatment of oily sludge from petroleum industry: A review", Journal of Hazardous Materials 261 (2013) pp. 470-490.

Li et al., "Ultrasonic desorption of petroleum hydrocarbons from crude oil contaminated soils", Journal of Environmental Science and Health, Part A (2013) 48, pp. 1378-1389.

Drilling waste management technology review, International Association of Oil & Gas Producers, Re-port 557, Jun. 2016 pp. 1-102.

Jin et al., "Oil Recovery from Oil Sludge through Combined Ultrasound and Thermochemical Cleaning Treatment", American Chemical Society, Ind. Eng. Chem. Res. 2012, 51, pp. 9213-9217.

Kim et al., "Effect of ultrasound on oil removal from soils", Ultrasonics 41 (2003) pp. 539-542.

International Search Report and Written Opinion issued in PCT/US2021/037254, dated Aug. 31, 2021, 13 pages, European Patent Office.

* cited by examiner

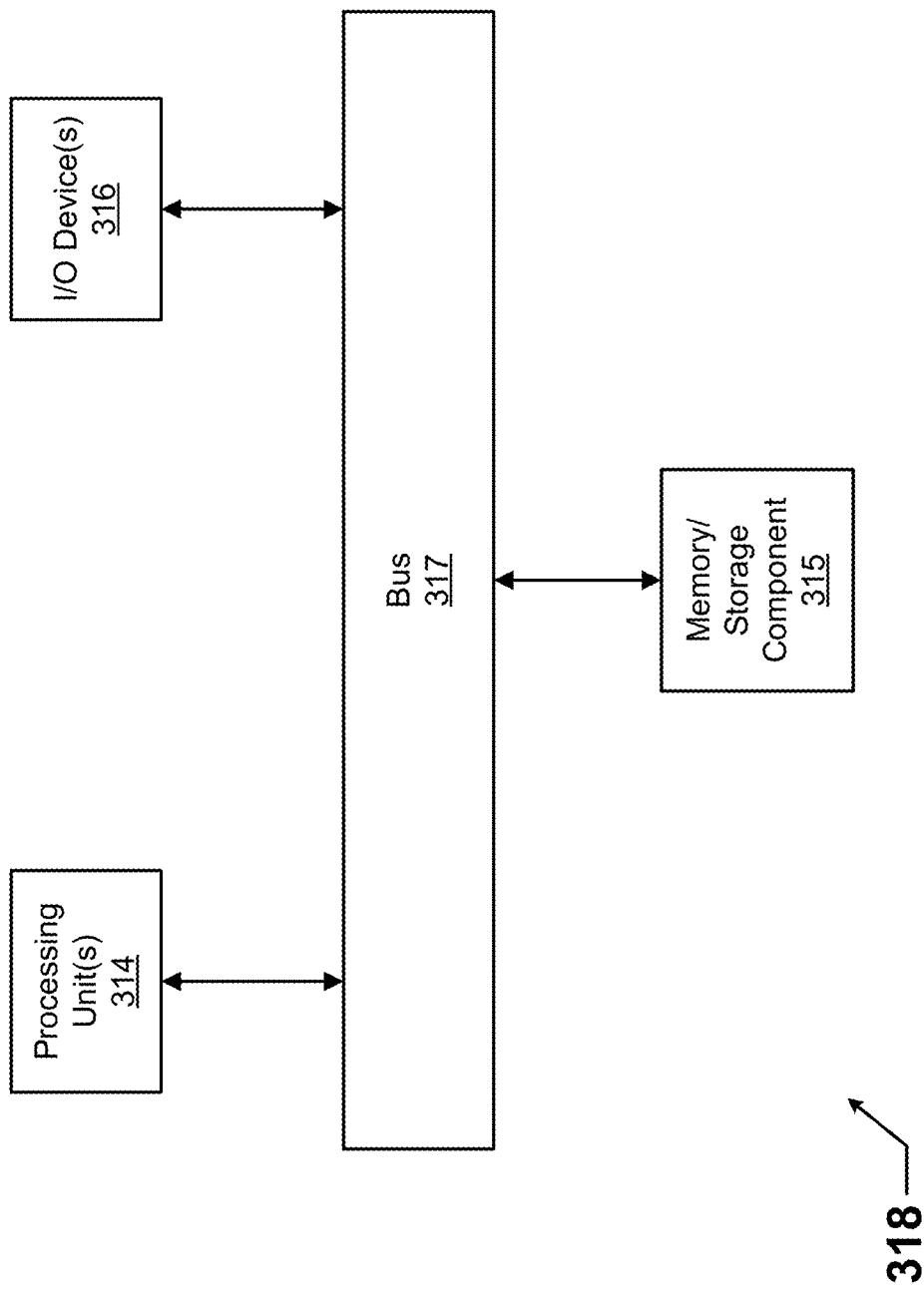

SONICATION FOR SEPARATION OF MATERIALS IN FLUIDS

TECHNICAL FIELD

Embodiments described herein relate generally to separating materials in fluids, and more particularly to systems, methods, and devices for using sonication to separate materials in fluids.

BACKGROUND

There are a number of circumstances where fluids have multiple materials, where separation of those materials has a useful purpose. A number of these applications use a large amount of fluids that are continually added for a period of time. As examples, in oil and gas field operations, fluids that include a mixture of oil and solid cuttings are extracted from a wellbore of a subterranean formation on a continuous basis. In such cases, oily sludges can be generated from solids, sand, and sediment accumulating in process equipment and vessels, with examples including primary oil-water separators, oily sludge bottoms from impoundments, product or fluid holding tanks, heat exchangers, pipes and pigging waste. During production and refining operations, separating the oil from this fluid can be useful for more effective output and to ease disposal requirements.

SUMMARY

In general, in one aspect, the disclosure relates to a system that includes a multi-material fluid having a mixture of a first material and a second material. The system can also include a first vessel into which the multi-material fluid is disposed. The system can further include a first sonication device disposed, at least in part, in the multi-material fluid in the first vessel. The first sonication device, when operating, can emit a first plurality of ultrasound waves into the multi-material fluid. The first plurality of ultrasound waves can separate the first material and the second material from each other in the first vessel.

In another aspect, the disclosure can generally relate to a method for separating materials in a multi-material fluid. The method can include receiving, in a first vessel from a first portion of a fluid material moving system, the multi-material fluid, where the multi-material fluid includes a first material and a second material. The method can also include applying, using a first sonication device in the first vessel, a first plurality of ultrasound waves to the multi-material fluid, where the first plurality of ultrasound waves separates the first material and the second material from each other. The method can further include collecting the first material.

These and other aspects, objects, features, and embodiments will be apparent from the following description and the appended claims.

BRIEF DESCRIPTION OF THE DRAWINGS

The drawings illustrate only example embodiments of sonication for separation of materials in fluids and are therefore not to be considered limiting of its scope, as sonication for separation of materials in fluids may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

FIG. 3 shows a computing device in accordance with certain example embodiments.

DETAILED DESCRIPTION OF EXAMPLE EMBODIMENTS

Figure 1:
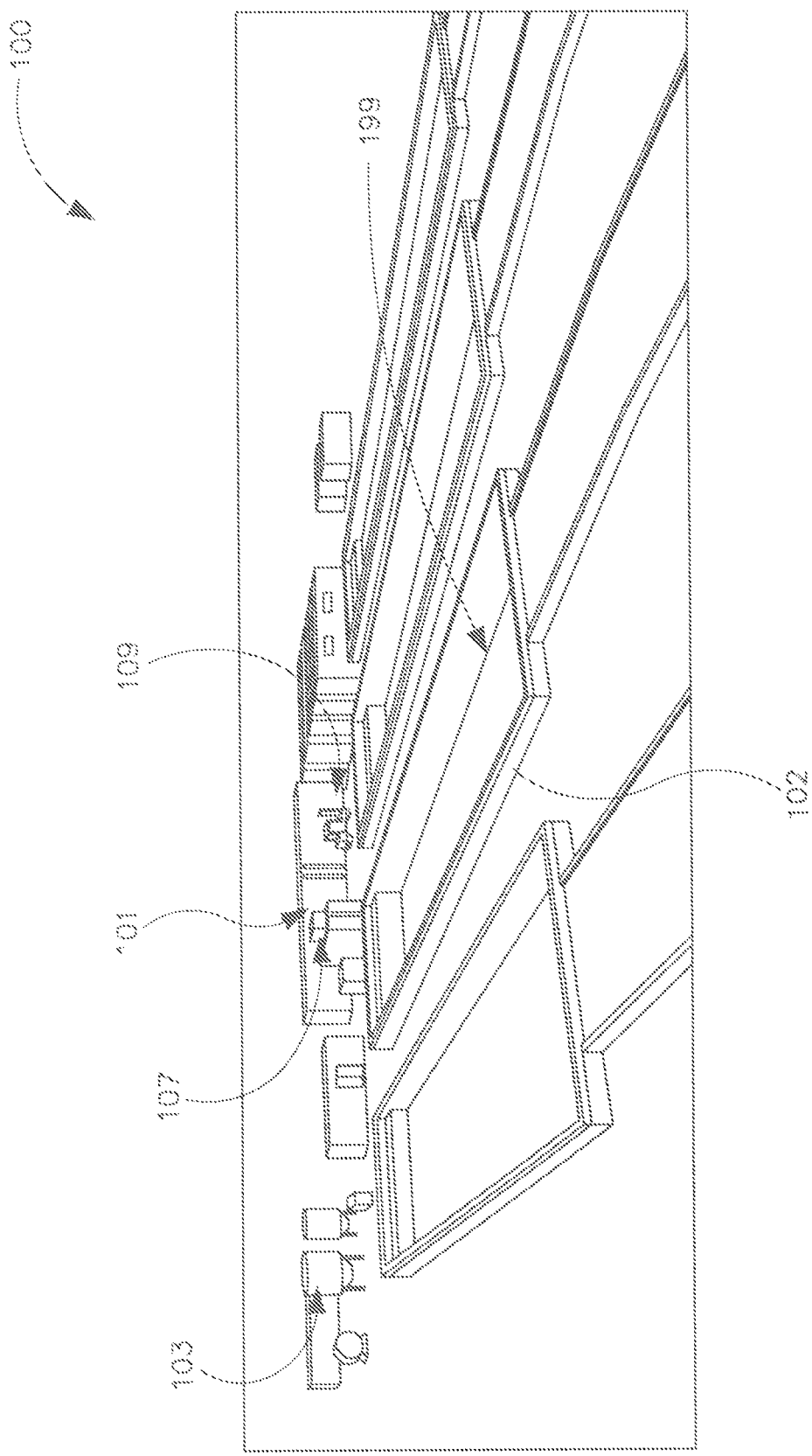
FIG. 1 shows a diagram of a system for separating materials in fluids currently used in the art.

The example embodiments discussed herein are directed to systems, methods, and devices for sonication for separation of materials in fluids. While example embodiments are described herein as being used with fluids containing hydrocarbons (e.g., oil) during exploration and/or production of a subterranean field (e.g., oilfield), example embodiments can also be used with fluids containing any of a number of other materials (e.g., gold, iron) that are used in any of a number of other applications (e.g., water extraction, formation fracturing, mining). Example embodiments can be used in any type of environment (e.g., indoor, outdoor, hazardous, non-hazardous, high humidity, low temperature, corrosive, sterile, high vibration).

In certain example embodiments, vessels in which multi-material fluids are stored or otherwise contained while using example embodiments are subject to meeting certain standards and/or requirements. Examples of entities that create such standards and regulations can include, but are not limited to, the National Electric Code (NEC), Underwriters Laboratory (UL), the National Electrical Manufacturers Association (NEMA), the International Electrotechnical Commission (IEC), the Society of Petroleum Engineers, the American Petroleum Institute (API), the International Standards Organization (ISO), and the Occupational Safety and Health Administration (OSHA), and the Institute of Electrical and Electronics Engineers (IEEE). Use of example embodiments described herein meet such standards when required.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three-digit number or a four-digit number, and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of sonication for separation of materials in fluids will be described more fully hereinafter with reference to the accompanying drawings, in which example embodiments of sonication for separation of materials in fluids are shown. Sonication for separation of materials in fluids may, however, be embodied in many different forms and should not be construed as limited to the example embodiments set forth herein. Rather, these example embodiments are provided so that this disclosure will be thorough and complete, and will fully convey the scope of sonication for separation of materials in fluids to those of ordinary skill in the art. Like, but not necessarily the same, elements (also sometimes called components) in the various figures are denoted by like reference numerals for consistency.

Terms such as "first", "second", "on", "upon", "outer", "inner", "top", "bottom", and "within" are used merely to distinguish one component (or part of a component or state of a component) from another. Such terms are not meant to denote a preference or a particular orientation. Such terms are not meant to limit embodiments of sonication for separation of materials in fluids. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a diagram of a system 100 for separating materials in fluids currently used in the art. The system 100 in this case includes four above-surface vessels 102 (e.g., engineered empoundments), a fluid 199 within each of the vessels 102, a feed hopper 107, a control module 109, a process mill module 101, and a tank 103. The fluid 199 in this case is an oily sludge of drilling mud and cuttings extracted from a wellbore of a subterranean field.

When the fluid 199 is an oily sludge (also sometimes called petroleum or oil-impacted sludges), the oily sludge is often generated as waste streams of an oil and gas production and refining operation and that requires proper treatment and disposal. Oily sludges can be generated from solids, sand, and sediment accumulating in process equipment and vessels, including but not limited to primary oil-water separators, oily sludge bottoms from impoundments, product or fluid holding tanks, heat exchangers, pipes, and pigging waste. Oily sludges and solids can also be generated because of unintentional oil product release that can impact soil and sediments in the environment.

The composition of fluid 199 in the form of oily sludge can include, but is not limited to, total petroleum hydrocarbon (TPH), water, metals, solid particles, and co-contaminants. The TPH content of oily sludge can vary widely and is often tested using chemical analysis to help determine how best to manage the oily sludge. TPH type and content can influence oil recovery potential, waste treatability performance, and waste minimization potential of oily sludges. At times, oily sludge with unrecovered oil is disposed of in industrial waste landfills or hazardous waste incinerators.

The known process used in this case to try to separate the hydrocarbons (e.g., oil) from the fluid 199 in the form of oily sludge is thermal desorption, in which hydrocarbons are separated from the fluid 199 through volatilization at pre-combustion temperatures. Thermal desorption typically includes a rotary kiln with indirect heating to volatize one or more of the materials in the fluid 199. The volatilized off-gas can be condensed through cooling to form a bulk recovered fluid 199 that contains water and hydrocarbons. The hydrocarbon/water mixture may undergo additional processing. Thermal desorption is generally an energy-intensive process due to the heating requirement to volatilize organics in the fluid 199.

Another process currently known in the art for separating materials within the fluid 199 in the form of oily sludge is centrifugation, where separation of liquids and solids in the fluid 199 is achieved through the use of centrifugal force developed by rapid rotation of a cylindrical vessel. Centrifuges can reach an acceleration rate of up to about 3,000 times Earth's gravity. When oily sludge enters a centrifuge system, it is forced against the interior walls of the cylinder, and separation occurs by the difference in density between the solids (approximately 1.2 times specific gravity) and the liquids (approximately 1.0 times specific gravity).

As a result, the heavier solids settle along the walls, and the liquids are trapped within the settled mass of solids and released by compaction. The output streams of solids and liquids are separated by the process. The addition of chemicals (e.g., demulsifiers, coagulants) and/or heating of the oily sludge can be used to improve separation efficiency in the centrifuge chamber. Centrifugation generally has high operating costs due to significant energy demand and, oftentimes, chemical additives.

Another process currently known in the art for separating materials within the fluid 199 in the form of oily sludge involves use of a belt press, similar to paper manufacturing. In the belt press process, a belt filter press uses moving belts and a series of rollers to continuously dewater solids of the oily sludge through compression, gravity drainage, and chemical conditioning of the feed stream. While the belt press process is considered a lower energy and less noisy alternative to centrifuges, operational complications exist. Specifically, incoming oily sludge is fed into a flocculation zone, where light mixing encourages floe formation.

This mixture flows into a gravity drainage section of a porous moving belt, where fluids are drained with gravity assistance. Following gravity drainage, pressure is applied to squeeze opposing porous moving belts, and the resulting material is passed through a series of rollers to induce the additional release of fluids. Wash water is typically added in the process to mitigate clogging of the belts. One challenge with belt presses is the high potential for "squeeze out" of solids to the sides of the belt press, which can require more maintenance attention.

Yet another process currently known in the art for separating materials within the fluid 199 in the form of oily sludge involves use of a filter press. A filter press system is a batch or semi-batch operation where fixed volume of the oily sludge is fed through equipment helps to separate liquids and solids using pressure filtration. The input oily sludge is pumped into the feed of the inlet, and the solids accumulate on the filter cloth, where most of the separation occurs as a first pass through the filter cloth. The concentrated solids cake and are trapped between the filter cloths that cover recessed plates. At the beginning of a press cycle, larger particles bridge the openings of the filter cloth and some fines may pass through.

As the process progresses, a "coating" layer of particles is trapped by the filter as more and more particles are collected. The filtrate is collected at the end of the press for discharge. When the pressing cycle is complete, the plates are separated, and the dried solid cake drops via gravity into a collection system such as a hopper or conveyor. Wash water is often used to wash the plates at the end of a filtration cycle. The main disadvantages of filter presses are high operating and maintenance costs, the need for additional treatment chemicals, and issues with cake being adhered to the filter medium that need to be removed. Filter presses also have a high energy requirement because of the need to pressurize the units during a press cycle. Further, the presence of oil and grease in the oily sludge can impair the smooth operation of the filters, which may need to be degreased at specific intervals.

Still another process currently known in the art for separating materials within the fluid 199 in the form of oily sludge is solvent extraction, where oily sludge is mixed with a chemical solvent (e.g. toluene), which selectively dissolves the oils within the oily sludge and leaves the less soluble impurities behind. The dissolved oil-solvent solution can then be transferred to a solvent distillation system where the solvent is separated from the dissolved oil. The separated and dissolved oil is considered recovered oil, while the separated solvent vapor can be liquefied through a compressor and cooling system, and then subsequently sent to a solvent recycling tank. The recycled solvent can be used to repeat the extraction cycle. Mixing and heating the solution with solvent can improve the solvent extraction process. One major challenge for large scale use of solvent extraction is the need of a large volume of organic solvents to be available and used. This can be costly, and there are also concerns from an environmental and human health perspective.

Another example of a fluid 199 that can be targeted in a separation process is oil-based mud (OBM) that is contaminated with drill cuttings. Drill cuttings are generated during oil and gas exploration and drilling operations, when subsurface material (e.g., soil, sand, rock) is cut by a drill bit and subsequently carried to the surface by either water-based drilling fluid (WBF) or non-aqueous (organic) drilling fluid (NAF). NAF, which is an expensive fluid that can be reused if recoverable, can be formulated with diesel, mineral oil, and/or low-toxicity linear olefins, paraffins and esters. The NAF content remaining in drill cuttings waste is typically defined as retention on cuttings (ROC), which represents a financial loss since new fluids must be purchased to replace fluids that are lost and disposed of as waste.

The existing commercial methods for enhanced oil separation from solids in OBM cuttings include primary solids control and secondary cuttings cleaning. The primary separation of the OBM and drill cuttings mixture is performed as a first step to recover drilling fluid for reuse. Secondary cuttings cleaning is deployed as needed to help clean cuttings to meet environmental requirements for final disposal or discharge (e.g. in onshore or offshore oil and gas exploration and production settings).

There are several known methods used in primary solids control. For example, shale shakers can be used, where the mixture of fluid and cuttings returning from the subsurface passes through a shale shaker. A shaking motion of the shale shaker splits the stream of fluids and cuttings into a mostly fluid portion and a mostly cuttings/solids portion. Shale shakers are the established technology that uses one or more screens to separate drill cuttings from drilling fluid. The size of the solids removed depends on the mesh size of the screens. Screen-based solids control equipment commonly achieves a ROC of 10%-15% by weight. Another method used in primary solids control is adding hydrocyclones (also called desanders and desilters) during a drilling operation. Hydrocyclones can separate sand or silt-sized cuttings that pass through the shaker screens with the rest of the OBM-contaminated drill cuttings. Yet another method used in primary solids control is using a centrifuge, as discussed above.

As for secondary cuttings cleaning, one method used is to incorporate one or more centrifugal cuttings dryers, which are used when drilling with NAF to further separate fluids from the cuttings produced by and/or that pass through shale shakers in the primary control process. The centrifugal cuttings dryers improve recovery of the drilling fluid from the OBM-contaminated drill cuttings and reduces ROC for the drill cuttings prior to final disposition. The centrifugal cuttings dryers also remove excess residual fluid from drill cuttings using a spinning basket arrangement that imparts a large centrifugal force for separation of solids from liquid. The centrifugal cuttings dryers are available in vertical or horizontal configurations. Centrifugal cuttings dryers commonly achieve a ROC of 5%-10% by weight.

Another method used for secondary cuttings cleaning is thermal desorption. There are several different known thermal desorption technologies that can be used for drilling fluid recovery. One technology is a very similar set up to the rotary drum/kiln system described above. Another technology that is commonly used is friction-derived thermal desorption, which uses a high-speed (e.g., 500 rpm) rotating shaft connected to a series of hammer arms inside a cylindrical process chamber (sometimes called a hammermill or mill) to grind and heat the drill cuttings. The rotating arms pulverize the cuttings and the resulting friction heats the cuttings to an elevated temperature. This process volatizes the water and hydrocarbons and leaves a clean dry powder. Volatized hydrocarbons and water and be condensed for further collection and separation recovery. Thermal desorption commonly achieves a ROC of <1% by weight.

Rather than using any of the above-discussed known methods and technologies, example embodiments use sonication, which is previously an unused technology for these types of separation applications with respect to oily sludges and OBM-contaminated drill cuttings.

Figure 2A:
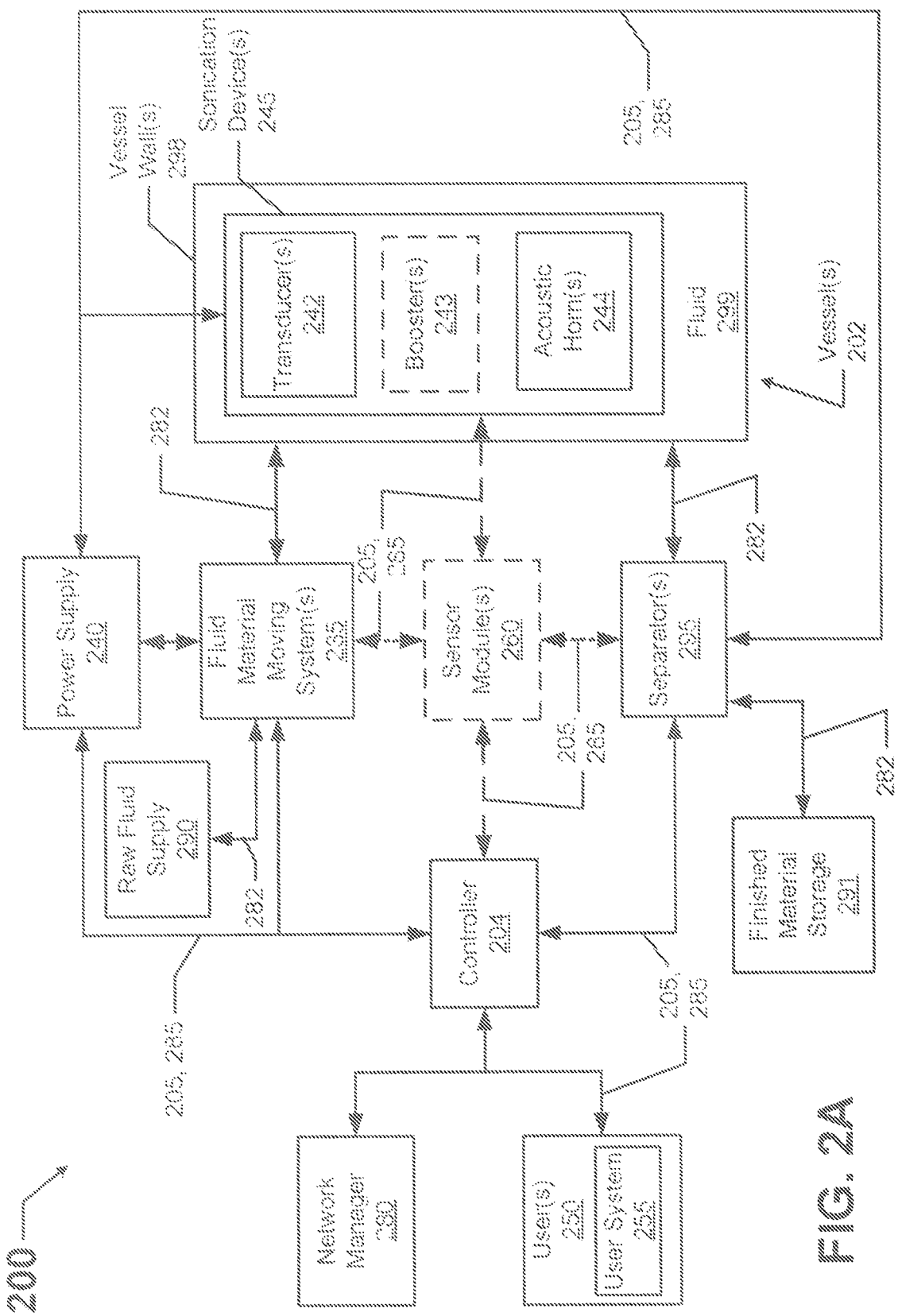
FIGS. 2A and 2B show a diagram of a system that uses sonication in accordance with certain example embodiments.
Figure 2B:
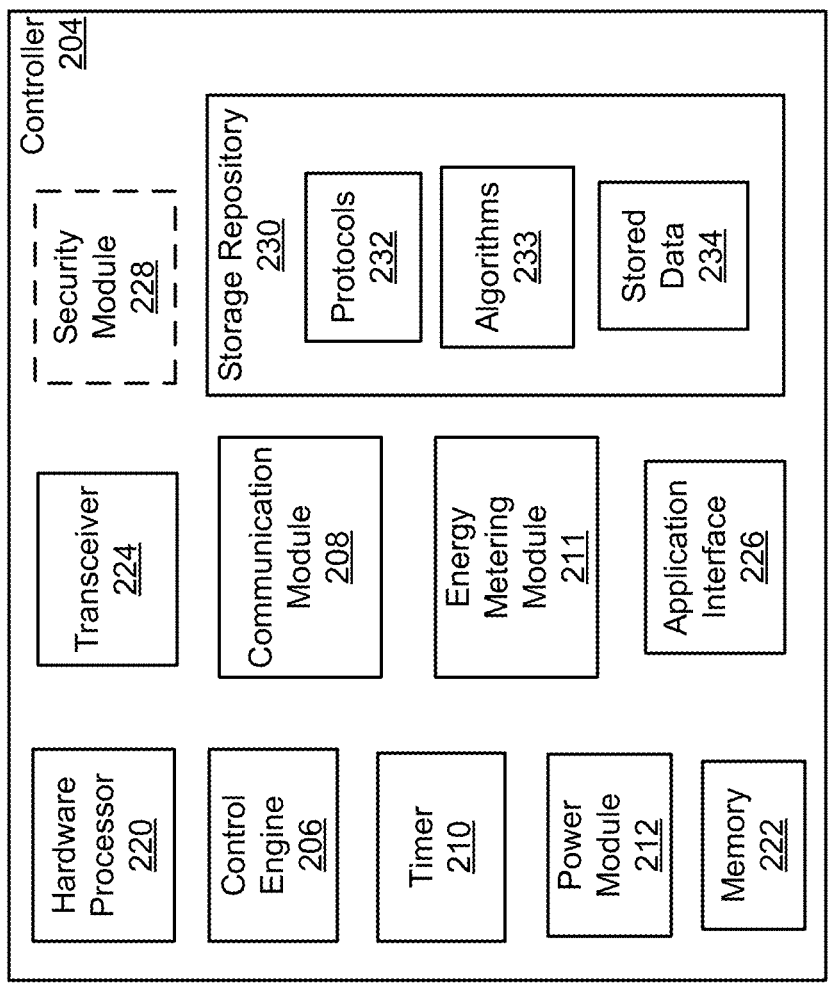

FIGS. 2A and 2B show a system diagram of a system 200 that uses sonication in accordance with certain example embodiments. Specifically, FIG. 2A shows the system 200, and FIG. 2B shows the controller 204 of the system 200. Referring to FIGS. 1 through 2B, in addition to the controller 204, the system 200 includes one or more vessels 202, a power supply 240, a raw fluid supply 290, one or more fluid material moving devices 235, one or more separators 295, one or more sonication devices 245, one or more users 250, a network manager 280, one or more optional sensor modules 260 (also called sensor devices 260 herein), and finished material storage 291. Each sonication device 245 can include one or more transducers 242, one or more optional boosters 243, and one or more acoustic horns 244. The optional components are shown in dashed lines in FIG. 2A.

The controller 204 can include one or more of a number of components. As shown in FIG. 2B, such components can include, but are not limited to, a control engine 206, a communication module 208, a timer 210, an energy metering module 211, a power module 212, a storage repository 230, a hardware processor 220, a memory 222, a transceiver 224, an application interface 226, and, optionally, a security module 228. The components shown in FIGS. 2A and 2B are not exhaustive, and in some embodiments, one or more of the components shown in FIGS. 2A and 2B may not be included in an example system 200. Any component of the example system 200 can be discrete or combined with one or more other components of the system 200.

For example, the controller 204 can be part of the power supply 240. As another example, a sensor device 260 can be part of, but remotely located from, a transducer 242 of a sonication device 245. As another example, some or all of the fluid material moving system 235 can be disposed between one or more of the vessels 202 and one or more of the separators 295. As still another example, some or all of the fluid material moving system 235 can be disposed between one or more of the separators 295 and the finished material storage 291. As yet another example, the system 200 can include one or more agitators, such as the agitators discussed below with respect to FIGS. 10, 11, and 13.

A user 250 can be any person that interacts with the controller 204, the network manager 280, and/or any other components (e.g., the power supply 240, a transducer 242 of a sonication device 245, a sensor module 260) of the system 200. Examples of a user 250 may include, but are not limited to, a company representative, a site manager, an engineer, an electrician, an instrumentation and controls technician, a public utility, a service employee, a driver for a transportation company, a maintenance employee, an operator, a consultant, a contractor, and a manufacturer's representative.

A user 250 can use one or more of a number of user systems 255 (sometimes also called user devices 255), which may include a display (e.g., a GUI). Examples of a user system 255 can include, but are not limited to, a cell phone, a laptop computer, an electronic tablet, and a desktop computer. A user system 255 can send and receive communication signals using the communication links 205.

A user 250 (including an associated user system 255) can interact with (e.g., send data to, receive data from) the controller 204 via the application interface 226 (described below). A user 250 (including an associated user system 255) can also interact with one or more vessels 202, a power supply 240, the raw fluid supply 290, one or more fluid material moving devices 235, one or more separators 295, one or more sonication devices 245, one or more users 250, the network manager 280, one or more optional sensor modules 260, and the finished material storage 291. In some cases, the system 200 can include multiple vessels 202, multiple controllers 204, multiple sensor modules 260, and/or multiples of other components of the system 200. In such a case, a user 250 (including an associated user system 255) can also interact with those additional components, and the additional components can be configured to communicate, directly or indirectly, with each other.

Interaction between a user 250 (including an associated user system 255) and the other components of the system 200 is conducted using communication links 205 and/or one power transfer links 285. Each communication link 205 and each power transfer link 285 can include wired (e.g., Class 1 electrical cables, Class 2 electrical cables, electrical connectors, power line carrier, RS485) and/or wireless (e.g., Wi-Fi, visible light communication, cellular networking, Bluetooth, Bluetooth Low Energy (BLE), Ultra Wideband (UWB), ISA100) technology. For example, a communication link 205 can be (or include) one or more electrical conductors that are coupled to the controller 204 and to a sensor module 260.

Each communication link 205 can transmit signals (e.g., communication signals, control signals, data) between two or more components of the system 200. Similarly, a power transfer link 285 can transmit power between two or more components of the system 200. One or more communication links 205 and/or one or more power transfer links 285 can also transmit signals and power, respectively, within a component (e.g., the controller 204, the power supply 240) of the system 200.

The network manager 280 is a device or component that controls all or a portion of a communication network, control network, and/or power distribution network within the system 200. The network manager 280 can also directly or indirectly control one or more components (e.g., the controller 204) of the system 200, or portions thereof, using the communication network. The network manager 280 can be substantially similar to the controller 204. Alternatively, the network manager 280 can include one or more of a number of features in addition to, or altered from, the features of the controller 204 described below. In some cases, the network manager 280 can be called by a number of other names known in the art, including but not limited to an insight manager, a master controller, a gateway, and a network controller.

The power supply 240 provides power to various components (e.g., the controller 204, the transducers 242 of the sonication devices 245, the fluid material moving devices 235, the separators 295) of the system 200. The power supply 240 can include one or more components (e.g., a generator, a transformer, a motor control center, protective relays, fuses, contactors). The power supply 240 can include one or more of a number of single or multiple discrete components (e.g., transistor, diode, resistor), and/or a microprocessor. In some cases, the power supply 240 can include a printed circuit board, upon which the microprocessor and/or one or more discrete components are positioned.

A power supply 240 can include one or more components (e.g., a transformer, a diode bridge, an inverter, a converter) that receives power (for example, through an electrical cable) from an external source of power and generates power of a type (e.g., alternating current, direct current) and level (e.g., 12V, 24V, 120V, 480V, 4160V) that can be used by the controller 204, the transducers 242 of the sonication devices 245, the fluid material moving devices 235, the separators 295, and/or any other components of the system 200. In addition, or in the alternative, a power supply 240 can be or include a source of power in itself. For example, a power supply 240 can be or include a battery, a supercapacitor, a photovoltaic solar generating system, or some other source of independent power. The power supply 240 can also include one or more components (e.g., a switch, a relay, a transceiver, a controller) that allow the power supply 240 to communicate with and/or follow instructions from a user 250 (including an associated user system 255), the controller 204, one or more sensor devices 260, and/or other components of the system 200.

The one or more example sensor modules 260 can include one or more sensors that measure one or more parameters. Examples of types of a sensor of a sensor module 260 can include, but are not limited to, a passive infrared sensor, a photocell, a pressure sensor, an air flow monitor, a fluid level detector, a vibration sensor, a gas detector, a voltmeter, an ammeter, a camera, and a resistance temperature detector. Examples of a parameter measured by a sensor of a sensor module 260 can include, but are not limited to, proximity, occupancy, motion, fluid level, vibration, a current, a voltage, a temperature, a pressure, fluid flow, an amount of energy, and an amount of ambient light.

A sensor device 260 can be integrated. An integrated sensor device 260 has the ability to sense and measure at least one parameter, and also the ability to directly communicate with at least one other component (e.g., the controller 204, the network manager 280, a user system 255) of the system 200. The communication capability of an integrated sensor device 260 can include one or more communication devices that are configured to communicate with, for example, the controller 204 and/or the network manager 280.

Each integrated sensor device 260 can use one or more of a number of communication protocols. This allows an integrated sensor device 260 to communicate with one or more components (e.g., the controller 204, a user system 255, one or more other integrated sensor devices 260) of the system 200. The communication capability of an integrated sensor device 260 can be dedicated to the sensor device 260 and/or shared with the controller 204 or some other component of the system 200. When the system 200 includes multiple integrated sensor devices 260, one integrated sensor device 260 can communicate, directly or indirectly, with one or more of the other integrated sensor devices 260 in the system 200.

If the communication capability of an integrated sensor device 260 is dedicated to the sensor device 260, then the integrated sensor device 260 can include one or more components (e.g., a transceiver 224, a communication module 208), or portions thereof, that are substantially similar to the corresponding components described below with respect to the controller 204. A sensor device 260, whether integrated or not, can be associated with a component of the system 200. In such a case, the sensor device 260 can be located within the housing of the component of the system 200, disposed on the housing of the component of the system 200, or located remotely from the housing of the component of the system 200.

In certain example embodiments, a sensor module 260 can include an energy storage device (e.g., a battery) that is used to provide power, at least in part, to some or all of the sensor module 260. The energy storage device of the sensor module 260 can operate at all times or only when a primary source of power to the sensor module 260 is interrupted. In some cases, a sensor module 260 can utilize or include one or more components (e.g., memory 222, storage repository 230, transceiver 224) found in the controller 204. In such a case, the controller 204 can provide the functionality of these components used by the sensor module 260. Alternatively, as with an integrated sensor module 260, a sensor module 260 can include, either on its own or in shared responsibility with the controller 204 or other component of the system 200, one or more of the components of the controller 204 or other component of the system 200. In such a case, the sensor module 260 can correspond to a computer system as described below with regard to FIG. 3.

The system 200 can include one or more fluid material moving systems 235. A fluid material moving system 235 is configured to move fluid 299 (or one or more portions thereof) from one part (e.g., a vessel 202, the raw fluid supply 290) of the system 200 to another part (e.g., a separator 295, the finished material storage 291) of the system 200 through the fluid conveyance system 282. A fluid material moving system 235 can include one or more components that operate as an assembly. For example, if a fluid material moving system 235 is a pump assembly, then such components can include, but are not limited to, a motor, an impeller, a filter, a valve, electrical cable, a circuit breaker, a protective relay, portions of the fluid conveyance system 282, a gauge, and a local controller. As another example, if a fluid material moving system 235 is working in conjunction with a portion of the fluid material moving system 235 in the form of a conveyer belt, the fluid material moving system 235 can include components such as a motor, a gear box, a junction box, and a local controller.

Generally speaking, the fluid 299 includes one or more of a number of materials. Such materials can be in solid form (e.g., cuttings, rocks, sand, metals), liquid form (e.g., water, oil), and/or gaseous form (e.g., hydrogen, sulfur dioxide). Example embodiments are designed to separate one or more of these materials from the remainder of the fluid 299, either to simplify processing of the resulting fluid 299 or to use the extracted material for some other purpose. While the term "fluid" is used in many places herein (e.g., fluid conveyance system 282) to describe something with contents that are mostly in liquid form, in some cases a fluid 299 can consist mostly of solids with small or trace amounts of liquids. For example, in FIGS. 11 and 13 below, fluid conveyance system 1182-2 and fluid conveyance system 1382-2 are each designed to remove part of the fluid 1199 and fluid 1399, respectively, that is mostly in solid form with small amounts of liquid.

The fluid material moving system 235 works in conjunction with the fluid conveyance system 282, which can include a number of pipe segments that are connected with each other to form a path for the fluid 299 (or portions thereof) to flow therethrough. A pipe segment of the fluid conveyance system 282 can be a linear tube segment, a curved tube segment, an elbow, a junction (e.g., T-junction, Y-junction), or any other suitable component that can be used to facilitate the flow of fluid 299 (or portions thereof) therethrough. A pipe segment of the fluid conveyance system 282 can be rigid or flexible.

In some cases, one or more portions of the fluid conveyance system 282 can be open (rather than enclosed). Examples of such open portions of the fluid conveyance system 282 can include, but are not limited to, a flow channel, a funnel, a conveyer belt, an auger, a bed of a dump truck, and a ramp with a groove disposed in its outer surface. In yet other cases, one or more portions of the fluid conveyance system 282 can be enclosed but mobile, as with a tank loaded on a rail car or the bed of a truck. The fluid conveyance system 282 can be made of one or more of a number of materials, including but not limited to plastic (e.g., PVC), steel, stainless steel, copper, cement, rubber, and aluminum. The fluid conveyance system 282 (or portions thereof) can be controlled in one or more of a number of ways. For example, the fluid conveyance system 282 (or portions thereof) can be controlled by a local controller (e.g., a manual switch, a microprocessor-based control module). As another example, the fluid conveyance system 282 (or portions thereof) can be controlled by the controller 204.

The raw fluid supply 290 of the system 200 is an ultimate and/or intermediate source from which the raw fluid 299 originates. Examples of a raw fluid supply 290 can include, but are not limited to, a subterranean wellbore, a storage tank, a mud pit, a slurry pit, and roll-off steel containers. The raw fluid supply 290 is the source of the fluid 299 (e.g., oily sludge, OBM-contaminated drill cuttings, oilfield-produced water) in its raw, unseparated form.

Each vessel 202 of the system 200 is designed to hold, either on a long-term or a short-term basis, an amount of the fluid 299 or portions thereof. An example of a vessel 202 can be the vessels 102 shown above with respect to FIG. 1. A vessel 202 can have any shape (e.g., spherical, cubic, rectangular cuboid, cylindrical, conical) and/or size. Each vessel 202 is designed to hold a maximum volume and weight of one or more particular types of fluids 299 or portions thereof. A vessel 202 can be made of one or more of a number of materials, including but not limited to steel, stainless steel, copper, cement, plastic (e.g., PVC), ceramic, rock, sand, and aluminum. Examples of a vessel 202 can include, but are not limited to, a tank, a pit, and a pipe. A vessel 202 can be completely enclosed, partially enclosed (e.g., one or more apertures that traverse one or more walls), or partially open (e.g., no top or ceiling).

A vessel 202 can include or be made of one or more vessel walls 298. In some cases, one or more vessel walls 298 of a vessel 202 can have one or more apertures that traverse therethrough. In such a case, an aperture can be occupied by the fluid conveyance system 282 to facilitate the transfer of some or all of the fluid 299 into the vessel 202 and/or out of the vessel 202. The vessel walls 298 can additionally or alternatively allow for other features (e.g., drains, vents) to facilitate the separation of hydrocarbons and/or other materials from the fluid 299. When there are multiple vessels 202 in the system 200, one vessel 202 can be placed in series and/or in parallel with one or more of the other vessels 202. When two vessels 202 in a system 200 are in communication with each other, such communication can be facilitated by part of the fluid conveyance system 282.

According to example embodiments, there are one or more sonication devices 245 disposed in or in communication with each vessel 202. A sonication device 245 disperses ultrasound waves (e.g., waves at a frequency>20 kHz) into the fluid 299 to force separation of materials in the fluid 299. An illustration of how materials in a fluid 299 are separated using sonication is shown below with respect to FIG. 4. As shown in FIG. 2A, a sonication device 245 can include multiple components. For example, a sonication device 245 can include one or more transducers 242, one or more boosters 243, one or more acoustic horns 244, and any form and combination of acoustic horn housing for energy delivery, including but not limited to probes and/or plates.

A transducer 242 (also called by other names such as a converter) of a sonication device 245 converts the power received from the power supply 240 to a level (e.g., 24V, 120V, 480V) and a type (e.g., alternating current, direct current) of power needed to operate one or more other components of the sonication device 245. A transducer 242 can be contained in a housing having any of a number of shapes and sizes. Also, the housing of a transducer 242 can be configured to be disposed within (and comply with any applicable standards for) any of a number of environments, including but not limited to hazardous environments, submersible environments, wet environments, humid environments, high vibration environments, high temperature environments, and corrosive environments.

An optional booster 243 of a sonication device 245 is disposed between the transducer 242 and the acoustic horn 244. A booster 243 is configured to adjust (e.g., increase) the amplitude of the ultrasound waves emitted by the sonication device 245. A booster 243 can be disposed within the housing of the transducer 242. Alternatively, a booster 243 can be disposed in its own housing. In such a case, the housing of the booster 243 can be configured to be disposed within (and comply with any applicable standards for) whatever environment the transducer 242 is placed and designed.

An acoustic horn 244 (also known by other names including but not limited to a sonotrode, a tip, a probe, and a finger) of a sonication device 245 is disposed, at least in part, in the fluid 299 and delivers ultrasound waves into the fluid 299. An acoustic horn 244 can be contained in a housing having any of a number of shapes and sizes. Also, the housing of an acoustic horn 244 can be configured to be disposed within (and comply with any applicable standards for) whatever environment the transducer 242 is placed and designed.

When a sonication device 245 includes multiple components, one of those components can be integrated with, coupled to, or remotely located from one or more of the other components of the sonication device 245. Each sonication device 245 (or portions thereof) can be controlled in one or more of a number of ways. For example, a sonication device 245 (or portions thereof) can be controlled by a local controller (e.g., a manual switch, a microprocessor-based control module). As another example, a sonication device 245 (or portions thereof) can be controlled by the controller 204.

When a vessel 202 includes multiple sonication devices 245, those sonication devices 245 can have any of a number of different placements and/or orientations with respect to each other in the vessel 202. Also, when a system 200 includes multiple sonication devices 245, one sonication device 245 can be configured (e.g., in terms of size, in terms of shape, in terms of output) the same as, or differently than, the configuration of one or more of the other sonication devices 245.

Each separator 295 of the system 200 includes one or more pieces of equipment used to separate one or more components (e.g., water, oil, cuttings) from the fluid 299. There are a number of different types of separators used to separate a number of different components from a fluid 299. As non-exclusive examples, there are American Petroleum Industry (API) separators, shipboard oily water separators, gravity plate separators, centrifugal separators, hydrocyclone separators, floatation separators, filtration separators, and electrochemical separators.

Each separator 295 has different capabilities and are used in different industries. For example, oil-water separators are designed and selected after consideration of factors such as oil separation performance parameters and life cycle cost considerations. A separator 295 can receive the fluid 299 (or portion thereof) from a vessel 202 through the fluid conveyance system 282. In some cases, the fluid material moving system 235 (or portion thereof) can be used to force or induce the fluid to travel through the fluid conveyance system 282 to reach a separator 295. Each separator 295 can be controlled in one or more of a number of ways. For example, a separator 295 (or portions thereof) can be controlled by a local controller (e.g., a manual switch, a microprocessor-based control module). As another example, a separator 295 (or portions thereof) can be controlled by the controller 204.

The finished material storage 291 of the system 200 holds or stores, either on a long-term or a short-term basis, one or more of the separated materials from the fluid 299. The finished material storage 291 one or multiple parts. Each part of the finished material storage 291 can have any shape (e.g., spherical, cubic, rectangular cuboid, cylindrical, conical) and/or size. The finished material storage 291 is designed to hold a maximum volume and weight of one or more particular components or materials of the fluid 299. The finished material storage 291 can be made of one or more of a number of materials, including but not limited to stainless steel, copper, cement, plastic (e.g., PVC), ceramic, and aluminum.

The finished material storage 291 can be made of one or more walls. In some cases, one or more walls of the finished material storage 291 can have one or more apertures that traverse therethrough. In such a case, an aperture can be occupied by the fluid conveyance system 282 to facilitate the transfer of some or all of the components or materials of the fluid 299 into the finished material storage 291 and/or out of the finished material storage 291. The walls of the finished material storage 291 can additionally or alternatively allow for other features (e.g., drains, vents) to store hydrocarbons and/or other materials of the fluid 299.

A user 250 (including an associated user system 255), the network manager 280, the separators 295, the power supply 240, the sonication devices 245, the fluid material moving system 235, and/or the sensor modules 260 can interact with the controller 204 using the application interface 226 in accordance with one or more example embodiments. Specifically, the application interface 226 of the controller 204 receives data (e.g., information, communications, instructions, updates to firmware) from and sends data (e.g., information, communications, instructions) to a user 250 (including an associated user system 255), the network manager 280, the separators 295, the power supply 240, the sonication devices 245, the fluid material moving system 235, and/or each sensor module 260.

A user 250 (including an associated user system 255), the network manager 280, the separators 295, the power supply 240, the sonication devices 245, the fluid material moving system 235, and/or each sensor module 260 can include an interface to receive data from and send data to the controller 204 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The controller 204, a user 250 (including an associated user system 255), the network manager 280, the separators 295, the power supply 240, the sonication devices 245, the fluid material moving system 235, and/or the sensor modules 260 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 204. Examples of such a system can include, but are not limited to, a desktop computer with a Local Area Network (LAN), a Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 3.

Further, as discussed above, such a system can have corresponding software (e.g., user system software, sensor device software, controller software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the system 200.

The controller 204 can be a stand-alone component of the system 200. Alternatively, the controller 204 can be integrated with another component (e.g., the power supply 240, the fluid material moving system 235, the sonication devices 245, the separators 295) of the system 200. In such a case, the controller 204 can also perform other functions and/or include other modules aside from those shown in FIG. 2B.

The storage repository 230 of the controller 204 can be a persistent storage device (or set of devices) that stores software and data used to assist the controller 204 in communicating with one or more other components of the system 200. In one or more example embodiments, the storage repository 230 stores one or more protocols 232, one or more algorithms 233, and stored data 234. The protocols 232 can be any procedures (e.g., a series of method steps), logic steps, and/or other similar operational procedures that the control engine 206 of the controller 204 follows based on certain conditions at a point in time.

The protocols 232 can also include any of a number of communication protocols 232 that are used to send and/or receive data between the controller 204 and one or more other components of the system 200. One or more of the protocols 232 used for communication can be a time-synchronized protocol. Examples of such time-synchronized protocols can include, but are not limited to, a highway addressable remote transducer (HART) protocol, a wireless HART protocol, and an International Society of Automation (ISA) 100 protocol.

In this way, one or more of the protocols 232 used for communication can provide a layer of security to the data transferred within the system 200. Other protocols 232 used for communication can be associated with the use of Wi-Fi, Zigbee, visible light communication, cellular networking, ultra-wideband (UWB), Bluetooth Low Energy (BLE), and Bluetooth. One or more protocols 232 can facilitate communication between a sensor module 260 and the control engine 206 of the controller 204.

The algorithms 233 can be any formulas, mathematical models, forecasts, simulations, and/or other similar computational instruments that the control engine 206 of the controller 204 utilizes based on certain conditions at a point in time. One or more algorithms 233 can be used in conjunction with, or as a result of following, one or more protocols 231. Algorithms 233 can be focused on certain components of the system 200. For example, one or more algorithms 233 can use parameters measured by one or more sensor modules 260. As a specific example, a protocol 232 can be used by the control engine 206 to instruct a sensor module 260 to measure a parameter (e.g., an amount of vibration, a flow rate through part of the fluid conveyance system 282, a weight), for the sensor module 260 to send the measurement to the control engine 206, for the control engine 206 to analyze the measurement using one or more algorithms 233, and for the control engine 206 to take an action (e.g., increase the amplitude output by a transducer 242 of a sonication device 245, change the speed of a pump of the fluid material moving system 235) based on the result (stored as stored data 234) of the algorithm 233.

Stored data 234 can be any data associated with the system 200 (including any components thereof), any measurements taken by the sensor modules 260, measurements taken by the energy metering module 211, threshold values, tables, user preferences and settings, results of previously run or calculated algorithms 232, and/or any other suitable data. Such data can be any type of data, including but not limited to historical data, present data, and future data (e.g., forecasts). The stored data 234 can be associated with some measurement of time derived, for example, from the timer 210.

Examples of a storage repository 230 can include, but are not limited to, a database (or a number of databases), a file system, a hard drive, flash memory, cloud-based storage, some other form of solid state data storage, or any suitable combination thereof. The storage repository 230 can be located on multiple physical machines, each storing all or a portion of the protocols 232, the algorithms 233, and/or the stored data 234 according to some example embodiments. Each storage unit or device can be physically located in the same or in a different geographic location.

The storage repository 230 can be operatively connected to the control engine 206. In one or more example embodiments, the control engine 206 includes functionality to communicate with one or more other components of the system 200. More specifically, the control engine 206 sends information to and/or receives information from the storage repository 230 in order to communicate with one or more other components of the system 200. As discussed below, the storage repository 230 can also be operatively connected to the communication module 208 in certain example embodiments.

In certain example embodiments, the control engine 206 of the controller 204 controls the operation of one or more components (e.g., the communication module 208, the timer 210, the transceiver 224) of the controller 204. For example, the control engine 206 can activate the communication module 208 when the communication module 208 is in "sleep" mode and when the communication module 208 is needed to send data received from another component (e.g., a sensor module 260, a user system 255 of a user 250) in the system 200.

As another example, the control engine 206 can acquire the current time using the timer 210. The timer 210 can enable the controller 204 to control one or more components of the system 200 even when the controller 204 has no communication with the network manager 280. As yet another example, the control engine 206 can determine (e.g., based on measurements made by one or more sensor modules 260, based on time tracked by the timer 210, based on instructions received from a user 250) when one or more of the sonication devices 245 should be operated in a particular way at a particular point in time so that the fluid 299 in a corresponding vessel 202 undergoes sonication.

The control engine 206 of the controller 204 can control the power supply 240 (or portions thereof) in any of a number of ways based on any of a number of factors. For example, a user 250 (e.g., using a user system 255) can instruct the control engine 206 as to when a sonication device 245 or part of the fluid material moving system 235 should be operating, and to what extent (e.g., adjust the frequency and/or amplitude of the ultrasound waves emitted by the sonication device 245, adjust the speed at which a pump of the fluid material moving system 235 operates), to enable separating materials in the fluid 299.

As yet another example, a parameter (e.g., level of the fluid 299 in a vessel 202, flow rate of the fluid 299 into, within, and/or out of a vessel 202, amount of hyrdocarbons extracted from the fluid 299, operational status of a separator 295) measured by a sensor module 260 can be communicated to the control engine 206. In such a case, when the parameter falls below or exceeds some threshold value (part of the stored data 234), the control engine 206 can instruct one or more components of the system 200 to operate in a particular way.

The control engine 206 of the controller 204 can communicate with one or more of the example sensor modules 260 and make determinations based on measurements made by the example sensor modules 260. For example, the control engine 206 can use one or more protocols 232 and/or algorithms 233 to facilitate communication with a sensor module 260. As a specific example, the control engine 206 can use one or more protocols 232 to instruct a sensor module 260 to measure a parameter, for the sensor module 260 to send the measurement to the control engine 206, for the control engine 206 to analyze, using one or more algorithms 233, the measurement, (stored as stored data 234), and for the control engine 206 to take an action (e.g., instruct, using a protocol 232, one or more other components (e.g., a pump of the fluid material moving system 235, a sonication device 245) of the system 200 to operate or change state) based on the result (stored as stored data 234) of the analysis.

The control engine 206 can also send and/or receive communications. As a specific example, the control engine 206 can use one or more algorithms 233 to receive (using a protocol 232) a signal, for the control engine 206 to analyze the signal, and for the control engine 206 to take an action based on the result of the analysis. As another specific example, the control engine 206 can use one or more protocols 232 and/or algorithms 233 to determine that a communication to a device or component (e.g., a user 250) within or external to the system 200 needs to be sent, and to send a communication signal (using a protocol 232 and saved as stored data 234).

When the control engine 206 receives the measurement of certain parameters from one or more sensor modules 260, the control engine 206 can follow one or more protocols 232 to operate in one of a number of operational modes (e.g., normal operating mode, energy saving mode, emergency mode, high efficiency mode). These modes can be fixed (e.g., based on default values, based on user instructions) or flexible (e.g., the control engine 206 can make adjustments to protocols 232 based on comparing actual results with forecast values).

The control engine 206 can provide control, communication, and/or other similar signals to one or more other components of the system 200. Similarly, the control engine 206 can receive control, communication, and/or other similar signals from one or more other components of the system 200. The control engine 206 can control each sensor module 260 automatically (for example, based on one or more algorithms stored in the control engine 206) and/or based on control, communication, and/or other similar signals received from another device through a communication link 205. The control engine 206 may include a printed circuit board, upon which the hardware processor 220 and/or one or more discrete components of the controller 204 are positioned.

In certain embodiments, the control engine 206 of the controller 204 can communicate with one or more components of a system external to the system 200. For example, the control engine 206 can interact with an inventory management system by ordering a part of the fluid material moving system 235 to replace the part when the control engine 206 has determined that the part has failed or is failing. As another example, the control engine 206 can interact with a workforce scheduling system by scheduling the removal of a material (e.g., a hydrocarbon) that has been extracted from the fluid 299 and disposed in the finished material storage 291. In this way, the controller 204 is capable of performing a number of functions beyond what could reasonably be considered a routine task.

In certain example embodiments, the control engine 206 can include an interface that enables the control engine 206 to communicate with one or more other components (e.g., power supply 240) of the system 200. For example, if the power supply 240 (or other component of the system 200) operates under IEC Standard 62386, then the power supply 240 (or other component of the system 200) can have a serial communication interface that will transfer data (e.g., stored data 234) measured by the sensor modules 260. In such a case, the control engine 206 can also include a serial interface to enable communication with the power supply 240 (or other component of the system 200). Such an interface can operate in conjunction with, or independently of, the protocols 232 used to communicate between the controller 204 and one or more other components of the system 200.

The control engine 206 (or other components of the controller 204) can also include one or more hardware components and/or software elements to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit (I2C), and a pulse width modulator (PWM).

The communication module 208 of the controller 204 determines and implements the communication protocol (e.g., from the protocols 232 of the storage repository 230) that is used when the control engine 206 communicates with (e.g., sends signals to, receives signals from) one or more other components of the system 200. In some cases, the communication module 208 accesses the stored data 234 to determine which protocol 232 is used to communicate with the sensor module 260 associated with the stored data 234. In addition, the communication module 208 can interpret the communication protocol of a communication received by the controller 204 so that the control engine 206 can interpret the communication.

The communication module 208 can send and receive data between one or more components of the system 200 and the controller 204. The communication module 208 can send and/or receive data in a given format that follows a particular protocol 232. The control engine 206 can interpret the data packet received from the communication module 208 using the protocol 232 information stored in the storage repository 230. The control engine 206 can also facilitate the data transfer between one or more sensor modules 260 and the network manager 280 or a user 250 (including an associated user system 255) by converting the data into a format understood by the communication module 208.

The communication module 208 can send data (e.g., protocols 232, algorithms 233, stored data 234, operational information, alarms) directly to and/or retrieve data directly from the storage repository 230. Alternatively, the control engine 206 can facilitate the transfer of data between the communication module 208 and the storage repository 230. The communication module 208 can also provide encryption to data that is sent by the controller 204 and decryption to data that is received by the controller 204. The communication module 208 can also provide one or more of a number of other services with respect to data sent from and received by the controller 204. Such services can include, but are not limited to, data packet routing information and procedures to follow in the event of data interruption.

The timer 210 of the controller 204 can track clock time, intervals of time, an amount of time, calendar time, and/or any other measure of time. The timer 210 can also count the number of occurrences of an event, whether with or without respect to time. Alternatively, the control engine 206 can perform the counting function. The timer 210 is able to track multiple time measurements concurrently. The timer 210 can track time periods based on an instruction received from the control engine 206, based on an instruction received from the user 250, based on an instruction programmed in the software for the controller 204, based on some other condition or from some other component, or from any combination thereof.

The timer 210 can be configured to track time when there is no power delivered to the controller 204 (e.g., the power module 212 malfunctions) using, for example, a super capacitor or a battery backup. In such a case, when there is a resumption of power delivery to the controller 204, the timer 210 can communicate any aspect of time to the controller 204. In such a case, the timer 210 can include one or more of a number of components (e.g., a super capacitor, an integrated circuit) to perform these functions. In some cases, time can be considered a parameter. In such a case, the timer 210 can be considered a type of sensor module 260.

The energy metering module 211 of the controller 204 measures one or more components of power (e.g., current, voltage, resistance, VARs, watts) at one or more points within the controller 204 and/or at any other component (e.g., a sonication device 245, part of a fluid material moving system 235, a separator 295) of which the controller 204 may be integrated. The energy metering module 211 can include any of a number of measuring devices and related components, including but not limited to a voltmeter, an ammeter, a power meter, an ohmmeter, a current transformer, a potential transformer, and electrical wiring. The energy metering module 211 can measure a component of power continuously, periodically, based on the occurrence of an event, based on a command received from the control module 206, and/or based on some other factor. For purposes herein, the energy metering module 211 can be considered a type of sensor (e.g., sensor module 260). In this way, a component of power measured by the energy metering module 211 can be considered a parameter herein.

In certain example embodiments, the power module 212 of the controller 204 receives power from a source of power (e.g., the power supply 240) in the system 200 and manipulates (e.g., transforms, rectifies, inverts) that power to provide the manipulated power to one or more other components (e.g., timer 210, control engine 206) of the controller 204. The power module 212 can include one or more of a number of single or multiple discrete components (e.g., transistor, diode, resistor), and/or a microprocessor. The power module 212 may include a printed circuit board, upon which the microprocessor and/or one or more discrete components are positioned. In some cases, the power module 212 can include one or more components that allow the power module 212 to measure one or more elements of power (e.g., voltage, current) that is delivered to and/or sent from the power module 212.

The power module 212 can include one or more components (e.g., a transformer, a diode bridge, an inverter, a converter) that receives power (for example, through an electrical cable) from the power supply 240 and generates power of a type (e.g., alternating current, direct current) and level (e.g., 12V, 24V, 120V) that can be used by the other components of the controller 204. The power module 212 can use a closed control loop to maintain a preconfigured voltage or current with a tight tolerance at the output.

The power module 212 can also protect the rest of the electronics (e.g., hardware processor 220, transceiver 224) in the controller 204 from surges generated in the line. In addition, or in the alternative, the power module 212 can be or include a source of power in itself to provide signals to the other components of the controller 204. For example, the power module 212 can be or include a battery.

In certain example embodiments, the power module 212 of the controller 204 can also provide power and/or control signals, directly or indirectly, to one or more of the sensor modules 260. In such a case, the control engine 206 can direct the power generated by the power module 212 to the sensor modules 260 of the electrical device 202. In this way, power can be conserved by sending power to the sensor modules 260 of the electrical device 202 when those devices need power, as determined by the control engine 206.

The hardware processor 220 of the controller 204 executes software, algorithms, and firmware in accordance with one or more example embodiments. Specifically, the hardware processor 220 can execute software on the control engine 206 or any other portion of the controller 204, as well as software used by one or more other components of the system 200. The hardware processor 220 can be or include an integrated circuit, a central processing unit, a multi-core processing chip, SoC, a multi-chip module including multiple multi-core processing chips, or other hardware processor in one or more example embodiments. The hardware processor 220 is known by other names, including but not limited to a computer processor, a microprocessor, and a multi-core processor.

In one or more example embodiments, the hardware processor 220 executes software instructions stored in memory 222 of the controller 204. The memory 222 includes one or more cache memories, main memory, and/or any other suitable type of memory. The memory 222 can include volatile and/or non-volatile memory. The memory 222 is discretely located within the controller 204 relative to the hardware processor 220 according to some example embodiments. In certain configurations, the memory 222 can be integrated with the hardware processor 220.

In certain example embodiments, the controller 204 does not include a hardware processor 220. In such a case, the controller 204 can include, as an example, one or more field programmable gate arrays (FPGA), one or more insulated-gate bipolar transistors (IGBTs), one or more complex programmable logic devices (CPLDs), programmable array logics (PALs), one or more digital signal processors (DSPs), and one or more integrated circuits (ICs). Using FPGAs, IGBTs, CPLDs, PALs, DSPs, ICs, and/or other similar devices known in the art allows the controller 204 (or portions thereof) to be programmable and function according to certain logic rules and thresholds without the use of a hardware processor. Alternatively, FPGAs, IGBTs, CPLDs, PALs, DSPs, ICs, and/or similar devices can be used in conjunction with one or more hardware processors 220.

The transceiver 224 of the controller 204 can send and/or receive control and/or communication signals. Specifically, the transceiver 224 can be used to transfer data between the controller 204 and one or more other components of the system 200. The transceiver 224 can use wired and/or wireless technology. The transceiver 224 can be configured in such a way that the control and/or communication signals sent and/or received by the transceiver 224 can be received and/or sent by another transceiver that is part of one or more components of the system 200. The transceiver 224 can use any of a number of signal types, including but not limited to radio frequency signals.

When the transceiver 224 uses wireless technology, any type of wireless technology can be used by the transceiver 224 in sending and receiving signals. Such wireless technology can include, but is not limited to, Wi-Fi, Zigbee, visible light communication, cellular networking, UWB, BLE, and Bluetooth. The transceiver 224 can use one or more of any number of suitable communication protocols (e.g., ISA100, HART) when sending and/or receiving signals. Such communication protocols can be stored in the protocols 232 of the storage repository 230. Further, any transceiver information for one or more other components of the system 200 can be part of the stored data 234 (or similar areas) of the storage repository 230.

Optionally, in one or more example embodiments, the security module 228 secures interactions between the controller 204 and one or more other components of the system 200. More specifically, the security module 228 authenticates communication from software based on security keys verifying the identity of the source of the communication. For example, user software may be associated with a security key enabling the software of a user system 255 of a user 250 to interact with the controller 204 and/or the sensor modules 260. Further, the security module 228 can restrict receipt of information, requests for information, and/or access to information in some example embodiments.

FIG. 3 illustrates one embodiment of a computing device 318 that implements one or more of the various techniques described herein, and which is representative, in whole or in part, of the elements described herein pursuant to certain exemplary embodiments. For example, the controller 204 of FIG. 2 and its various components (e.g., hardware processor 220, memory 222, control engine 206) can be considered a computing device 318 as in FIG. 3. Computing device 318 is one example of a computing device and is not intended to suggest any limitation as to scope of use or functionality of the computing device and/or its possible architectures. Neither should computing device 318 be interpreted as having any dependency or requirement relating to any one or combination of components illustrated in the example computing device 318.

Computing device 318 includes one or more processors or processing units 314, one or more memory/storage components 315, one or more input/output (I/O) devices 316, and a bus 317 that allows the various components and devices to communicate with one another. Bus 317 represents one or more of any of several types of bus structures, including a memory bus or memory controller, a peripheral bus, an accelerated graphics port, and a processor or local bus using any of a variety of bus architectures. Bus 317 includes wired and/or wireless buses.

Memory/storage component 315 represents one or more computer storage media. Memory/storage component 315 includes volatile media (such as random access memory (RAM)) and/or nonvolatile media (such as read only memory (ROM), flash memory, optical disks, magnetic disks, and so forth). Memory/storage component 315 includes fixed media (e.g., RAM, ROM, a fixed hard drive, etc.) as well as removable media (e.g., a Flash memory drive, a removable hard drive, an optical disk, and so forth).

One or more I/O devices 316 allow a customer, utility, or other user to enter commands and information to computing device 318, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 318 is connected to a network (not shown) (e.g., a LAN, a WAN such as the Internet, cloud, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 318 includes at least the minimal processing, input, and/or output means necessary to practice one or more embodiments.

Further, those skilled in the art will appreciate that one or more elements of the aforementioned computer device 318 is located at a remote location and connected to the other elements over a network in certain exemplary embodiments. Further, one or more embodiments is implemented on a distributed system having one or more nodes, where each portion of the implementation (e.g., control engine 206) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

Figure 4:
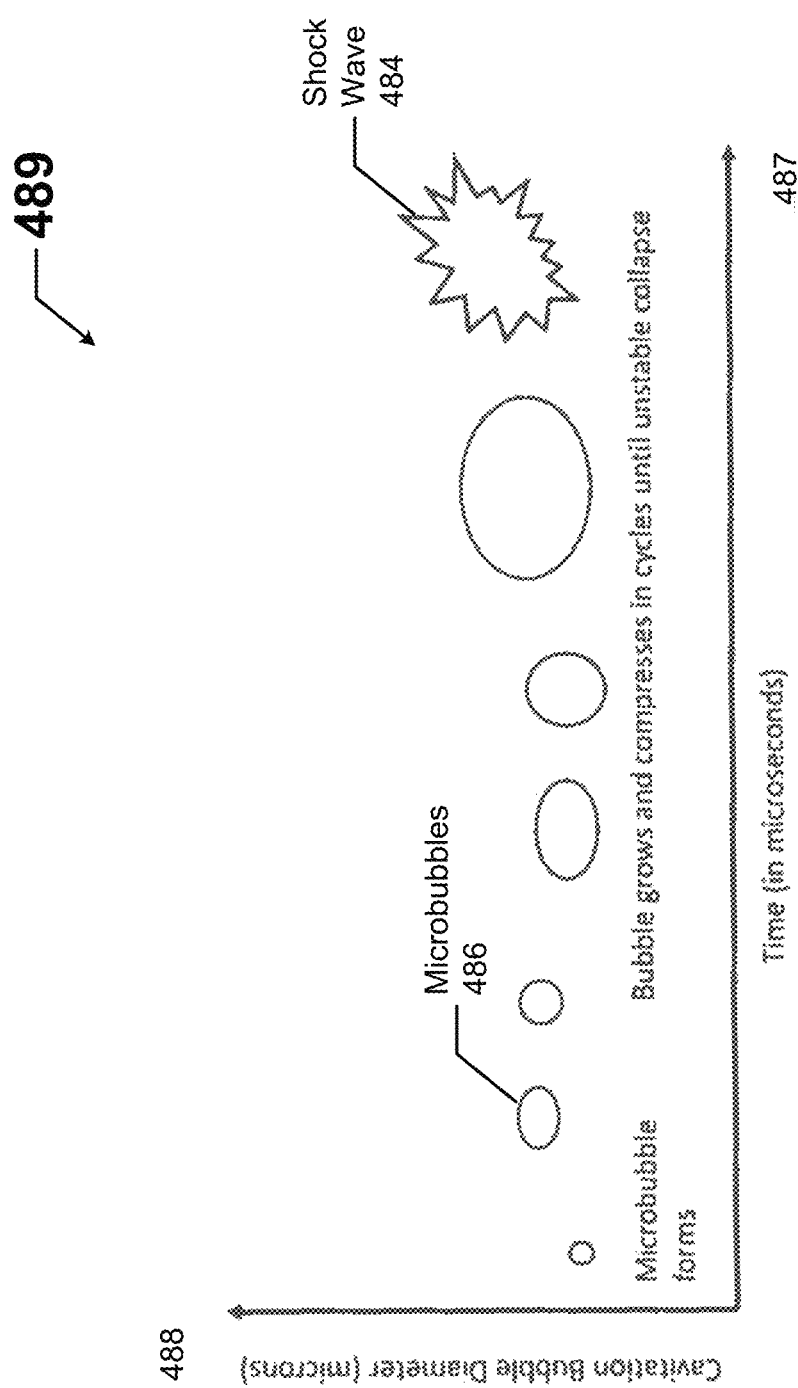
FIG. 4 shows a graph of how microbubbles are affected by ultrasonic waves in accordance with certain example embodiments.

FIG. 4 shows a graph 489 of how microbubbles 486 are generated by ultrasonic waves in accordance with certain example embodiments. Referring to FIGS. 1 through 4, the graph 489 shows the diameter 488 (in microns, along the vertical axis) of a microbubble 486 exposed to cavitation (by high frequency ultrasound waves) over time 487 (in microseconds). Specifically, the microbubble 486 increasingly grows and compresses over a few microseconds until the microbubble 486 becomes unstable and collapses.

As discussed above, the use of ultrasound (e.g., waves having a frequency>20 kHz) or sonication has been shown to assist in the desorption of materials from solid particles, separation of mixtures of solids and liquids, and destabilization of water and oil emulsions. Also known as cavitation phenomena, sonication generates compressions and rarefactions in a multi-material fluid (e.g., fluid 299). A compression cycle gives positive pressure on the fluid by pushing molecules together while a rarefaction cycle provides a negative pressure by pulling molecules in the fluid apart.

Due to this action, microbubbles 486 (sometimes called cavitation bubbles) nucleate and grow to micron sizes in the fluid. When these microbubbles 486 become unstable, they can collapse violently and generate localized shock waves 484, as shown in FIG. 4. Such cavitation phenomenon is known to increase local temperature to several thousand degrees and local pressure of several hundred atmospheres in a few microseconds. Ultimately, this localized high temperature and pressure can decrease the viscosity of the fluid, increase the mass transfer of solids into the liquid phase, and thus lead to destabilization of the fluid (e.g., water/oil emulsions).

The performance of oil recovery from oily sludge using ultrasonic treatment can be affected by a variety of factors, such as ultrasonic frequency, sonication power, sonication intensity, fluid content entrained or in emulsion, temperature, ultrasonic treatment duration, solid particle size, initial TPH concentration, and presence of surfactants or other chemicals (e.g. salts and solvents) in the fluid. The power ultrasound range (e.g., 20 kHz-100 kHz) has been demonstrated to show marked improvement of solids separation in an oily sludge matrix.

Figure 5:
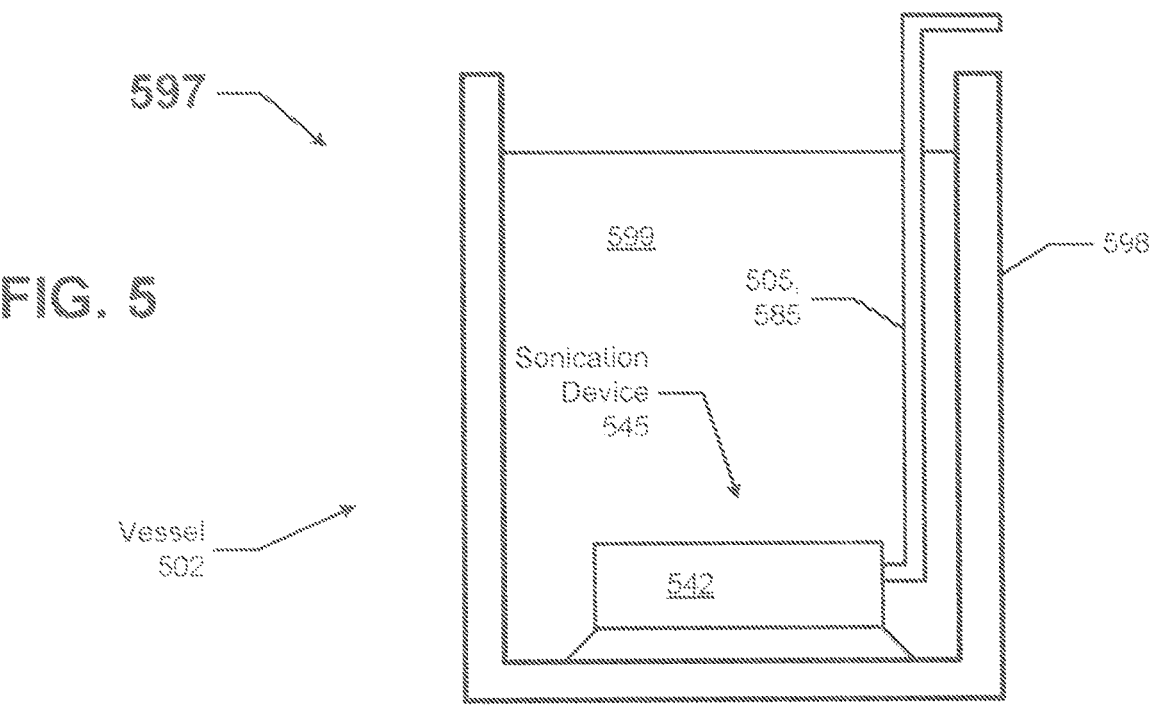
FIGS. 5 through 9 shows various configurations of a vessel assembly in accordance with certain example embodiments.
Figure 6:
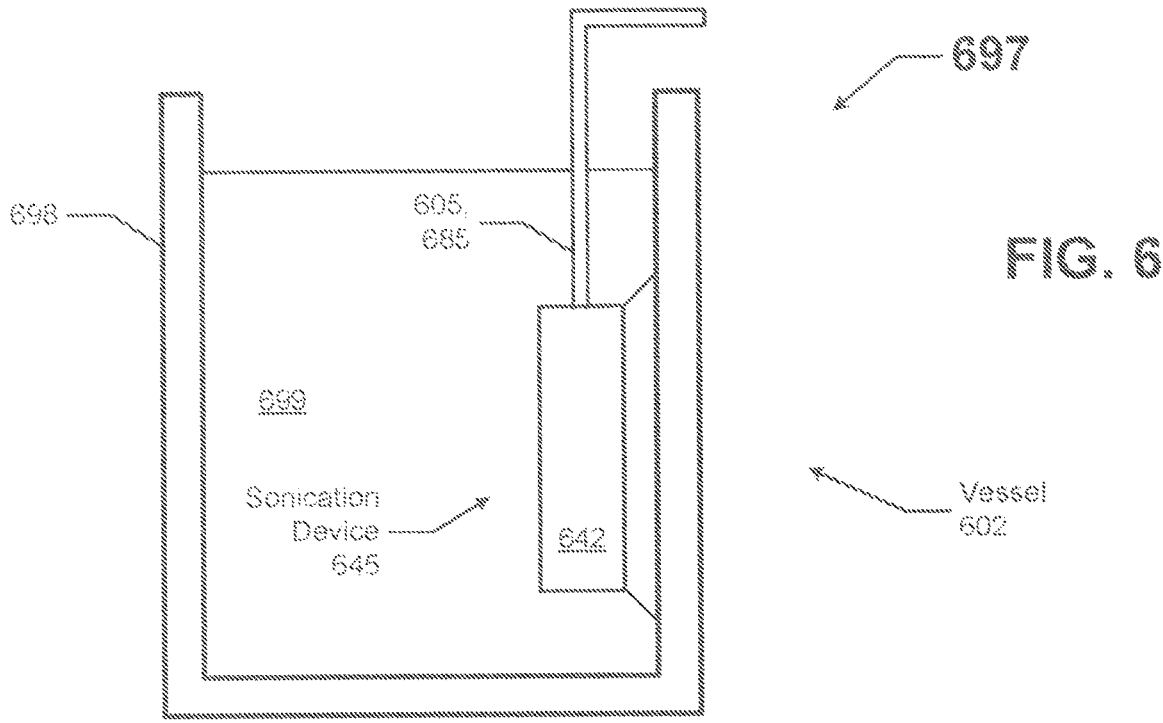
Figure 7:
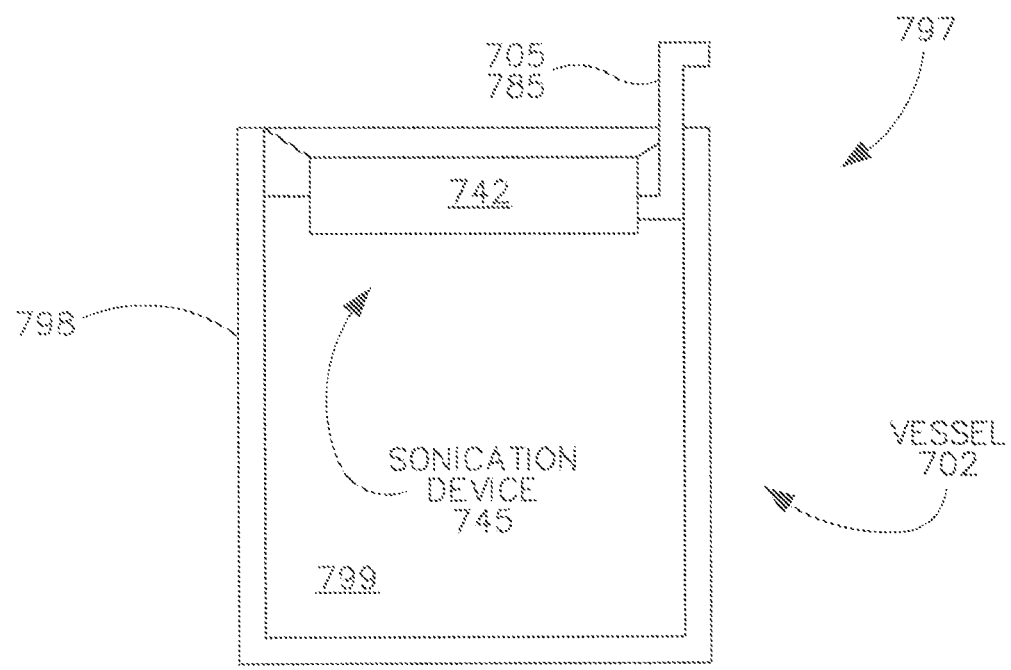
Figure 8:
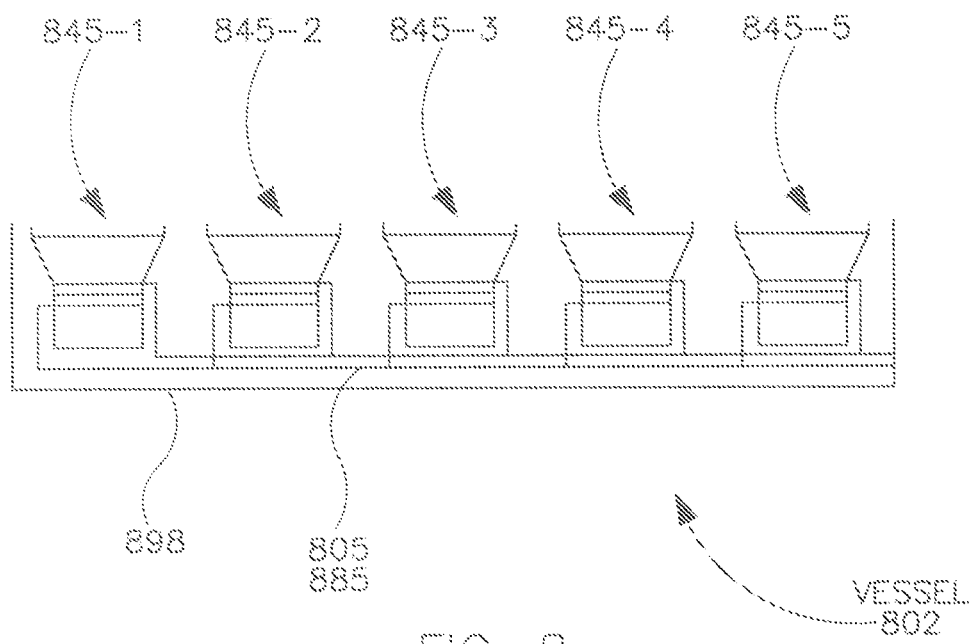
Figure 9:
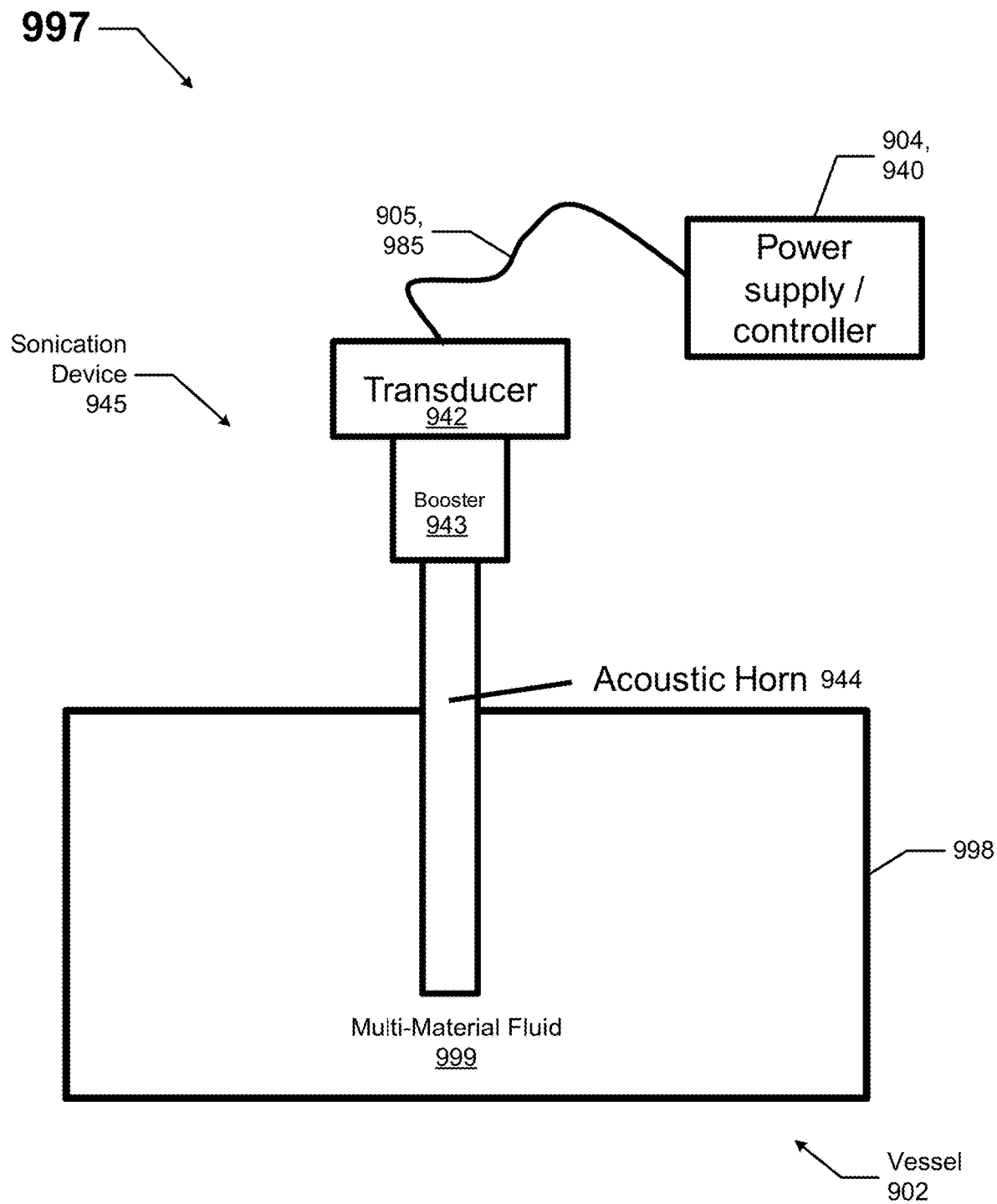

FIGS. 5 through 9 shows various configurations of a vessel assembly in accordance with certain example embodiments. Specifically, FIG. 5 shows a cross-sectional side view of vessel assembly 597. FIG. 6 shows a cross-sectional side view of vessel assembly 697. FIG. 7 shows a cross-sectional side view of vessel assembly 797. FIG. 8 shows a cross-sectional side view of vessel assembly 897. FIG. 9 shows a cross-sectional side view of vessel assembly 997. The various components of each vessel assembly of FIGS. 5 through 9 can be substantially the same as the corresponding components of the system 200 discussed above with respect to FIG. 2.

Referring to FIGS. 1 through 9, the vessel assembly 597 of FIG. 5 includes a vessel 502, a sonication device 545 mounted on a bottom wall 598 of the vessel 502, and a multi-material fluid 599 filling most of the vessel 502. In this way, the sonication device 545, including the transducer 542, is completely immersed in the fluid 599. The sonication device 545 receives electrical power and control signals through power transfer links 585 and communication links 505, respectively, in the form of an electrical cable from a power supply (e.g., power supply 240) and a controller (e.g., controller 204).

The vessel assembly 697 of FIG. 6 includes a vessel 602, a sonication device 645 mounted on a side wall 698 of the vessel 602, and a multi-material fluid 699 filling most of the vessel 602. In this way, the sonication device 645, including the transducer 642, is completely immersed in the fluid 699. The sonication device 645 receives electrical power and control signals through power transfer links 685 and communication links 605, respectively, in the form of an electrical cable from a power supply (e.g., power supply 240) and a controller (e.g., controller 204).

The vessel assembly 797 of FIG. 7 includes a vessel 702 having one or more walls 798 and an open top end, a sonication device 745 mounted at the open top end of the vessel 702, and a multi-material fluid 799 filling most of the vessel 702. In this way, only a portion of the sonication device 745, including at least a portion of the transducer 742, is immersed in the fluid 799. The sonication device 745 receives electrical power and control signals through power transfer links 785 and communication links 705, respectively, in the form of an electrical cable from a power supply (e.g., power supply 240) and a controller (e.g., controller 204).

The vessel assembly 897 of FIG. 8 includes a vessel 802 having one or more walls 898, a multi-material fluid 899 filling most of the vessel 802, and five sonication devices 845 (sonication device 845-1, sonication device 845-2, sonication device 845-3, sonication device 845-4, and sonication device 845-5) disposed, at least in part, in the fluid 898. The sonication devices 845 receive electrical power and control signals through power transfer links 885 and communication links 805, respectively, in the form of an electrical cable from a power supply (e.g., power supply 240) and a controller (e.g., controller 204).

The vessel assembly 997 of FIG. 9 includes a vessel 902 having one or more walls 998 and an open top end, a sonication device 945 mounted at the open top end of the vessel 902, a combination controller 904 and power supply 940, and a multi-material fluid 999 filling most of the vessel 902. The sonication device 945 includes a transducer 942, a booster 943, and an acoustic horn 944, where a portion of the acoustic horn 944 is immersed in the fluid 999, and where the remainder of the acoustic horn 944, all of the transducer 942, and all of the booster 943 are disposed outside of the fluid 999. The sonication device 945 receives electrical power and control signals through power transfer links 985 and communication links 905, respectively, in the form of an electrical cable from the power supply 940 and the controller 904.

The transducer 942, the booster 943, and the acoustic horn 944 are common components of the sonication device 945. The transducer 942 is the ultrasonic generator and most typically uses magnetostrictive or piezoelectric methods to produce sonic vibration. The booster 943 is an amplifier that mechanically increases the vibration generated by the transducer 942. The acoustic horn 944 delivers the ultrasound to the point of application (the fluid 999 in this case) within the vessel 902.

As stated above, ultrasonic waves are most typically generated by magnetostrictive or piezoelectric methods. With magnetostrictive generation, alternating current (AC) electrical energy is converted to mechanical vibration energy via a magnetic coil which, when energized, deforms the shape of a magnetized element (typically nickel or iron). Rapid energizing/de-energizing of the magnetic coil in response to the wave-frequency of the AC current forces rapid vibration of the element, which produces the sonic vibration. In piezoelectric generation, AC current that is tuned to the natural frequency of one or more piezoelectric crystals is used to generate the sonic waves. AC current in tune with a piezoelectric crystal forces the crystal to expand and contract at the wave-frequency of the AC current, thereby producing the ultrasonic waves.

Figure 10:
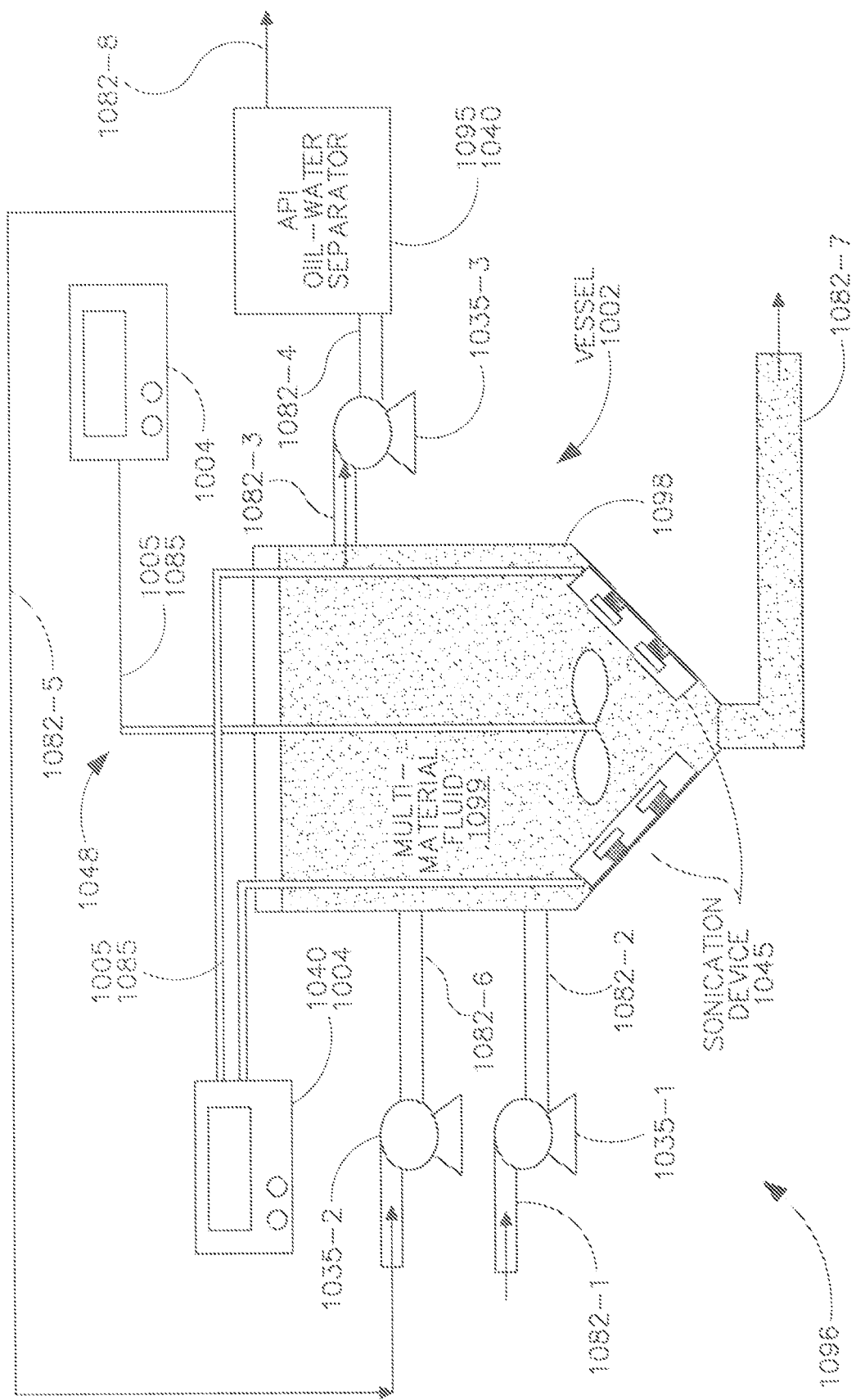
FIGS. 10 through 13 show different subsets of a system in accordance with certain example embodiments.
Figure 11:
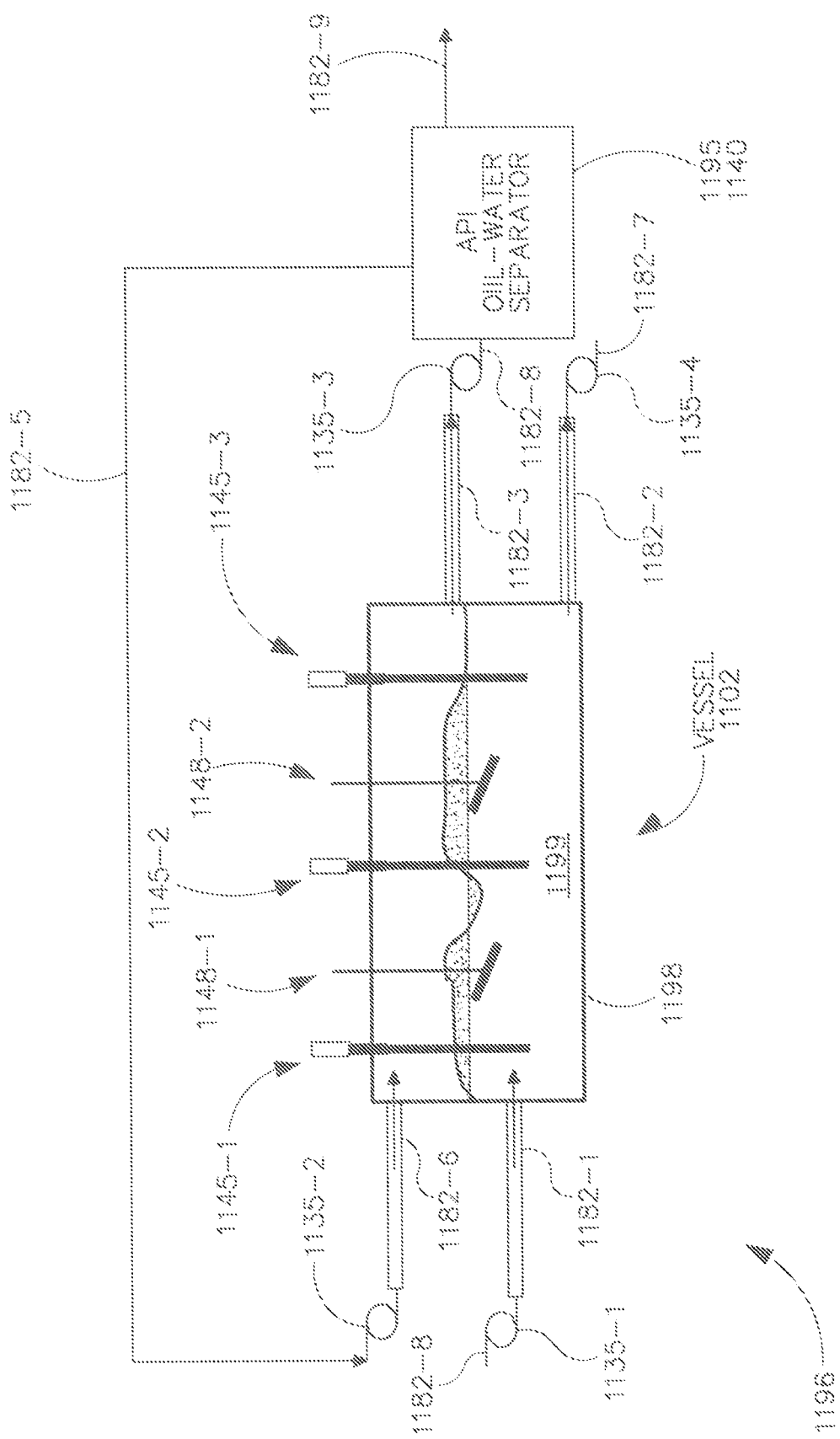
Figure 12:
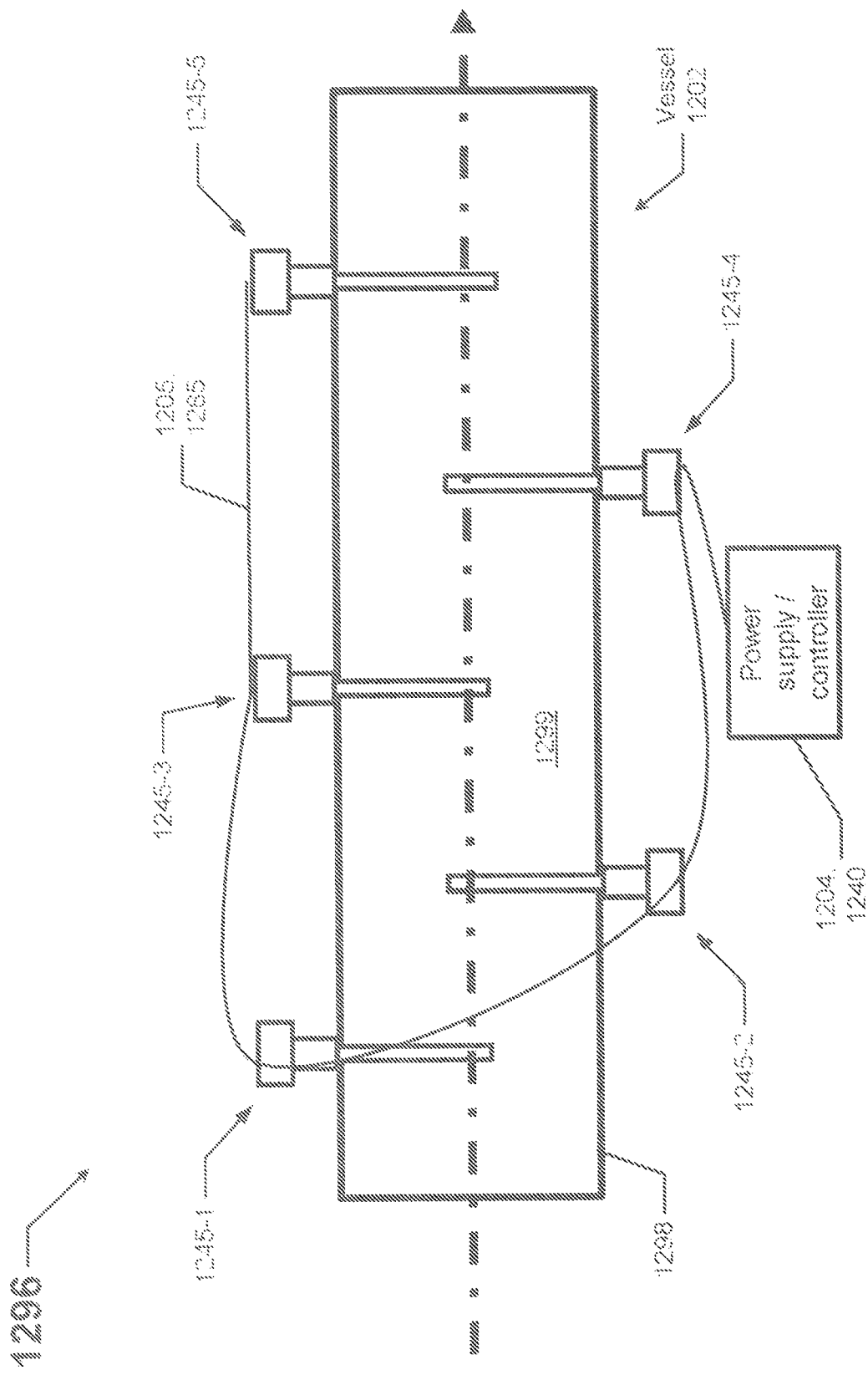
Figure 13:
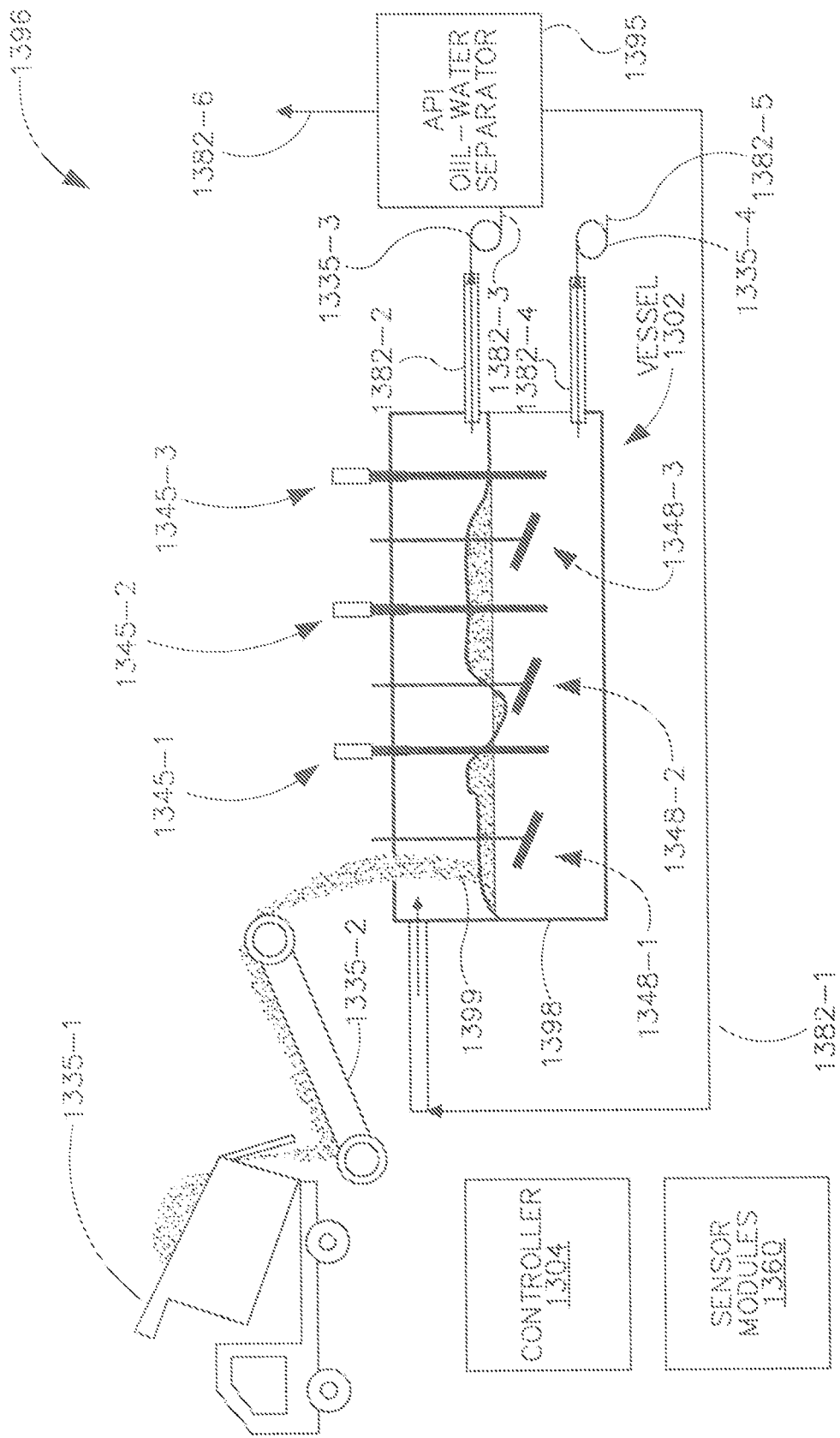

FIGS. 10 through 13 show different subsets of a system in accordance with certain example embodiments. Specifically, FIG. 10 shows a schematic of subset 1096 of a system. FIG. 11 shows a schematic of subset 1196 of a system. FIG. 11 shows a schematic of subset 1196 of a system. FIG. 12 shows a schematic of subset 1296 of a system. FIG. 13 shows a schematic of subset 1396 of a system. The various components of each subset of FIGS. 10 through 13 can be substantially the same as the corresponding components of the system 200 discussed above with respect to FIG. 2.

Referring to FIGS. 1 through 13, the subset 1096 of FIG. 10 includes a power supply 1040 with a controller 1004, a vessel 1002 having at least one wall 1098, multi-material fluid 1099 disposed in the vessel 1002, multiple sonication devices 1045 completely submerged in the fluid 1099 in the vessel 1002, an agitator 1048 with a controller 1004, a separator 1095, and multiple portions (in the form of pumps, although other equipment can be used) of a fluid material moving system 1035. In this case, the sonication devices 1045 are disposed at the bottom of the vessel 1002.

From a process flow perspective, the multi-material fluid 1099 is moved (from a raw fluid supply, such as raw fluid supply 290 in FIG. 2, not shown in FIG. 10) through a first part 1082-1 (in the form of piping) of a fluid conveyance system 1082, through a pump 1035-1 (or other component) of the fluid material moving system 1035, through a second part 1082-2 (in the form of piping) of the fluid conveyance system 1082, and into the vessel 1002. Simultaneously, another fluid (e.g., water) is moved through a part 1082-5 (in the form of piping) of the fluid conveyance system 1082, through a pump 1035-2 (or other component) of the fluid material moving system 1035, through another part 1082-6 (in the form of piping) of the fluid conveyance system 1082, and into the vessel 1002. The water (or other fluid) can dilute the fluid 1099 in the vessel 1002.

Inside the vessel 1002, the sonication devices 1045 operate to emit ultrasonic waves into the fluid 1099, which induces cavitation throughout the fluid 1099 in the vessel 1102. The sonication devices 1045 receive electrical power and control signals through power transfer links 1085 and communication links 1005, respectively, in the form of an electrical cable from the power supply 1040 and local controller 1004. The cavitation in the fluid 1099 results in one or more materials in the fluid 1099 to separate from one or more other materials in the fluid 1099. The agitator 1048 can operate to create movement of the fluid 1099 within the vessel 1002, resulting in more of the fluid 1099 being subject to the cavitation induced by the ultrasonic waves. Some of the material (e.g., solids, cuttings) in the fluid 1099 can settle to the bottom of the vessel 1002 as a result of the cavitation and be removed from the vessel 1002 through part 1082-7 (in the form of piping) of the fluid conveyance system 1082, eventually leading to part of the finished material storage (e.g., finished material storage 291).

The remainder of the fluid 1099 is removed from the vessel 1002 through a part 1082-3 (in the form of piping) of the fluid conveyance system 1082, through a pump 1035-3 (or other component) of the fluid material moving system 1035, through another part 1082-4 (in the form of piping) of the fluid conveyance system 1082, and into a separator 1095, which includes a local controller 1004. The separator 1095 separates the oil and water of the fluid 1099 from each other. The water is removed from the separator 1095 through the part 1082-5 (in the form of piping) of a fluid conveyance system 1082, essentially recycling the water for reuse in the vessel 1002 to dilute the fluid 1099. The oil is removed from the separator 1095 through a part 1082-8 (in the form of piping) of the fluid conveyance system 1082 (to finished material storage, as finished material storage 291 shown in FIG. 2, not shown in FIG. 11), thereby allowing the oil to be recovered.

The subset 1196 of FIG. 11 includes a vessel 1102 having at least one wall 1198, multi-material fluid 1199 disposed in the vessel 1102, three sonication devices 1145 (sonication device 1145-1, sonication device 1145-2, and sonication device 1145-3) partially submerged in the fluid 1199 in the vessel 1102, two agitators 1148 (agitator 1148-1 and agitator 1148-2) partially disposed in the fluid 1199 in the vessel 1102, a separator 1195 with a local controller 1140, and multiple portions (in the form of pumps, although other equipment can be used) of a fluid material moving system 1135. In this case, the sonication devices 1145 are mounted above the vessel 1102. The sonication devices 1145, the pumps, the agitators 1185, and the separator 1195 receive power and control from a power supply (e.g., power supply 240 from FIG. 2) and a controller (e.g., controller 204 from FIG. 2), not shown in FIG. 11, through power transfer links (e.g., power transfer links 285 from FIG. 2) and communication links (e.g., communication links 205 from FIG. 2), respectively, both not shown in FIG. 11.

From a process flow perspective, the multi-material fluid 1199 is moved through a part 1182-8 (in the form of piping) of a fluid conveyance system 1182, through a pump 1135-1 (or other component) of the fluid material moving system 1135, through a second part 1082-1 (in the form of piping) of the fluid conveyance system 1182, and into the vessel 1102. Simultaneously, another fluid (e.g., water) is moved through a part 1182-5 (in the form of piping) of the fluid conveyance system 1182, through a pump (or other component) 1135-2 of the fluid material moving system 1135, through another part 1182-6 (in the form of piping) of the fluid conveyance system 1182, and into the vessel 1102. The water (or other fluid) can dilute the fluid 1099 in the vessel 1102.

Inside the vessel 1102, the sonication devices 1145 operate to emit ultrasonic waves into the fluid 1199, which induces cavitation throughout the fluid 1199 in the vessel 1102. The cavitation in the fluid 1199 results in one or more material in the fluid 1199 to separate from one or more other materials in the fluid 1199. The agitators 1148 can operate to create movement of the fluid 1199 within the vessel 1102, resulting in more of the fluid 1199 being subject to the cavitation induced by the ultrasonic waves. In this case, the sonication devices 1145 and the agitators 1148 are arranged alternatively in a linear fashion within the vessel 1102. Some of the material (e.g., solids, cuttings) in the fluid 1199 can settle to the bottom of the vessel 1102 as a result of the cavitation and be removed from the vessel 1102 through part 1182-2 (in the form of piping or a conveyer belt) of the fluid conveyance system 1182, operated using a vacuum 1135-4 or motor 1135-4 of the fluid material moving system 1135, through another part 1182-7 (in the form of more piping or another conveyer belt) of the fluid conveyance system 1182, eventually leading to part of the finished material storage (e.g., finished material storage 291).

The remainder of the fluid 1199 is removed from the vessel 1102 through a part 1182-3 (in the form of piping) of the fluid conveyance system 1182, through a pump 1135-3 (or other component) of the fluid material moving system 1135, through another part 1182-8 (in the form of piping) of the fluid conveyance system 1182, and into a separator 1195, which includes a local controller 1104. The separator 1195 separates the oil and water of the fluid 1199 from each other. The water is removed from the separator 1195 through the part 1182-5 (in the form of piping) of a fluid conveyance system 1182, essentially recycling the water for reuse in the vessel 1102 to dilute the fluid 1199. The oil is removed from the separator 1195 through a part 1082-9 (in the form of piping) of the fluid conveyance system 1182 (to part of the finished material storage, such as finished material storage 291 shown in FIG. 2, not shown in FIG. 11), thereby allowing the oil to be recovered.

The subset 1296 of FIG. 12 includes a vessel 1202 (in this case, a section of pipe) having at least one wall 1298, multi-material fluid 1299 disposed in the vessel 1202, five sonication devices 1245 (sonication device 1245-1, sonication device 1245-2, sonication device 1245-3, sonication device 1245-4, and sonication device 1245-5) partially submerged in the fluid 1299 in the vessel 1202, and a power supply 1240 with a local controller 1204. In this case, the sonication devices 1245 are mounted on the sides of the vessel 1202. The sonication devices 1245 receive power and control from the power supply 1240 and the controller 1204 through power transfer links 1285 and communication links 1205, respectively, in the form of an electrical cable.

The subset 1396 of FIG. 13 includes a vessel 1302 having at least one wall 1398, multi-material fluid 1399 disposed in the vessel 1302, three sonication devices 1345 (sonication device 1345-1, sonication device 1345-2, and sonication device 1345-3) partially submerged in the fluid 1399 in the vessel 1302, three agitators 1348 (agitator 1348-1, agitator 1348-2, and agitator 1348-3) partially disposed in the fluid 1399 in the vessel 1302, a separator 1395, a power supply 1340, multiple sensor modules 1360, and multiple portions (in the form of pumps, although other equipment can be used) of a fluid material moving system 1335. In this case, the sonication devices 1345 and the agitators 1348 are mounted above the vessel 1302. The sonication devices 1345, the pumps, the agitators 1385, and the separator 1395 receive power and control from the power supply 1340 and the controller 1304 through power transfer links (e.g., power transfer links 285) and communication links (e.g., communication links 205), respectively, in the form of an electrical cable, not shown in FIG. 13. In this case, the multi-material fluid 1399 can be contaminated (e.g., impacted with crude oil) soil.

From a process flow perspective, the multi-material fluid 1399 is dumped from the bed of a dump truck 1335-1 of the fluid material moving system 1335 onto a conveyer belt 1335-2 of the fluid material moving system 1335, which transports and drops the fluid 1399 into the vessel 1302. Inside the vessel 1302, the sonication devices 1345 operate to emit ultrasonic waves into the fluid 1399, which induces cavitation throughout the fluid 1399 in the vessel 1302. The cavitation in the fluid 1399 results in the separation of one or more materials in the fluid 1399 from one or more other materials in the fluid 1399.

The agitators 1348 can operate to create movement of the fluid 1399 within the vessel 1302, resulting in more of the fluid 1399 being subject to the cavitation induced by the ultrasonic waves. In this case, the sonication devices 1345 and the agitators 1348 are arranged alternatively in a linear fashion within the vessel 1302. Some of the material (e.g., solids, cuttings) in the fluid 1399 can settle to the bottom of the vessel 1302 as a result of the cavitation and be removed from the vessel 1302 through part 1382-4 (in the form of piping or a conveyer belt) of the fluid conveyance system 1382, operated using a vacuum 1335-4 or motor 1335-4 of the fluid material moving system 1335, through another part 1382-5 (in the form of more piping or another conveyer belt) of the fluid conveyance system 1382, eventually leading to part of the finished material storage (e.g., finished material storage 291).

The remainder of the fluid 1399 is removed from the vessel 1302 through a part 1382-2 (in the form of piping) of the fluid conveyance system 1382, through a pump 1335-3 (or other component) of the fluid material moving system 1335, through another part 1382-3 (in the form of piping) of the fluid conveyance system 1382, and into a separator 1395. The separator 1395 separates the oil and water of the fluid 1399 from each other. The water is removed from the separator 1395 through the part 1382-1 (in the form of piping) of a fluid conveyance system 1382, essentially recycling the water for reuse in the vessel 1302 to dilute the fluid 1399. The oil is removed from the separator 1395 through a part 1382-6 (in the form of piping) of the fluid conveyance system 1382 (to part of the finished material storage, such as finished material storage 291 shown in FIG. 2, not shown in FIG. 13), thereby allowing the oil to be recovered.

As discussed above with respect to FIG. 2, the controller 1304 can alter, in real time, the operation of one or more components (e.g., one or more of the sonication devices 1345, one or more of the agitators 1348, one or more of the pumps (e.g., pump 1335-3), the separator 1395) based one measurements of one or more parameters made by one or more of the sensor modules 1365. Examples of operational aspects of components of the subset 1396 that can be modified by the controller 1304 can include, but are not limited to, the strength (e.g., interval) of the ultrasonic signals, the rate at which a pump (e.g., 1335-4) or other equipment operates, speed of one or more agitators 1348, the speed of the conveyer belt 1335-2, and the speed of the separator 1395.

In one or more example embodiments, one or more sonication devices are used to separate one or more materials (e.g., oil, sand, cuttings, water) from a multi-material fluid. For instance, example embodiments can enhance solids/liquids separation by sonication directly within oilfield containers, vessels, process equipment, and and piping where oily sludge and OBM-contaminated drill cuttings are generated, stored, or transferred. Example embodiments can use reduced energy demand compared to conventional separation equipment such as centrifuges, filter presses, and thermal desorption. Example embodiments have reduced potential for air emissions as compared to thermal treatment processes. Example embodiments can be used to recover oil from fluids (e.g., oily sludge, OBM-contaminated drill cuttings). Example embodiments can also remove one or more materials or components from a multi-material fluid to make the resulting components more easily (e.g., in terms of cost, in terms of environmental compliance, in terms of logistics) disposable relative to the disposal of the fluid before application of ultrasonic waves by example sonication devices. Example embodiments can be part of a newly manufactured processing facility, or alternatively example embodiments can be retrofitted into or work with an existing facility. Using example embodiments described herein can improve maintenance, costs, and operating efficiency.

Accordingly, many modifications and other embodiments set forth herein will come to mind to one skilled in the art to which example embodiments pertain having the benefit of the teachings presented in the foregoing descriptions and the associated drawings. Therefore, it is to be understood that example embodiments are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A system comprising:
   a multi-material fluid comprising a mixture of a first material and a second material;
   a first vessel into which the multi-material fluid is disposed, the first vessel comprising an inlet end and an outlet end, wherein the outlet end is on an opposite side of the first vessel from the inlet end; and
   a first sonication device disposed, at least in part, in the multi-material fluid in the first vessel,
   a second sonication device disposed, at least in part, in the multi-material fluid in the first vessel;
   a first agitator disposed between the first sonication device and the second sonication device, the first sonication device being disposed between the inlet end and the first agitator; and
   a second agitator disposed between the second sonication device and the outlet end
   wherein the first sonication device, when operating, emits a first plurality of ultrasound waves into the multi-material fluid,
   wherein the second sonication device, when operating, emits a second plurality of ultrasound waves into the multi-material fluid, and
   wherein the first plurality of ultrasound waves and the second plurality of ultrasound waves separate the first material and the second material from each other in the first vessel.

2. The system of claim 1, further comprising:
   a controller communicably coupled to the first sonication device, wherein the controller controls the first plurality of ultrasound waves emitted by the first sonication device.

3. The system of claim 2, further comprising:
   at least one sensor module communicably coupled to the controller, wherein the at least one sensor module measures at least one parameter, wherein the at least one parameter is associated with determining a rate at which the first material and the second material are separated from each other.

4. The system of claim 2, wherein the controller controls a frequency of the first plurality of ultrasound waves.

5. The system of claim 2, wherein the controller controls an amplitude of the first plurality of ultrasound waves.

6. The system of claim 1, further comprising:
   a second vessel into which at least a portion of the multi-material fluid is disposed;
   a fluid conveyance system disposed between the first vessel and the second vessel, wherein the fluid conveyance system transports the at least the portion of the multi-material fluid from the first vessel to the second vessel; and
   a third sonication device disposed, at least in part, in the at least the portion of the multi-material fluid in the second vessel.

7. The system of claim 1, wherein the first sonication device is suspended above the first vessel.

8. The system of claim 1, wherein the first sonication device is mounted to a side of the first vessel.

9. The system of claim 1, wherein the first sonication device is mounted to a bottom of the first vessel.

10. The system of claim 1, wherein the first material comprises a hydrocarbon, and wherein the second material comprises water.

11. The system of claim 1, wherein the first material comprises a hydrocarbon, and wherein the second material comprises cuttings.

12. The system of claim 1, further comprising:
a first fluid conveyance system extending from the first vessel, wherein the first fluid conveyance system transports at least a portion of the multi-material fluid from the first vessel; and
a separator that receives the at least the portion of the multi-material fluid from the first fluid conveyance system, wherein the separator separates out a third material from the at least the portion of the multi-material fluid.

13. The system of claim 12, further comprising:
a second fluid conveyance system extending from the separator, wherein the second fluid conveyance system transports the third material from the separator; and
a finished material storage that receives and stores the third material from the second fluid conveyance system.

14. The system of claim 12, further comprising:
a second fluid conveyance system extending from the separator, wherein the second fluid conveyance system recirculates a remainder of the at least the portion of the multi-material fluid into the first vessel.

15. The system of claim 1, wherein the first sonication device comprises a transducer, a booster, and an acoustic horn.

16. The system of claim 1, further comprising:
a first inlet disposed at the inlet end of the first vessel, wherein the multi-material fluid flows through the first inlet;
a second inlet disposed at the inlet end of the first vessel, wherein water flows through the second inlet and dilutes the multi-material fluid;
a first outlet disposed at the outlet end of the first vessel, wherein solids from the multi-material fluid flow through the first outlet; and
a second outlet disposed at the outlet end of the first vessel, wherein the second material flows through the second outlet.

17. A method for separating materials in a multi-material fluid, the method comprising:
receiving, in a first vessel from a first portion of a fluid material moving system, the multi-material fluid, wherein the multi-material fluid comprises a first material and a second material, and wherein the first vessel comprises an inlet end and an outlet end, the outlet end being on an opposite side of the first vessel from the inlet end;
applying a first plurality of ultrasound waves to the multi-material fluid using a first sonication device in the first vessel and applying a second plurality of ultrasound waves to the multi-material fluid using a second sonication device in the first vessel, wherein the first plurality of ultrasound waves and the second plurality of ultrasound waves separate the first material and the second material from each other;
agitating the multi-material fluid using a first agitator and a second agitator, wherein the first and second sonication devices and the first and second agitators are arranged in an alternating linear manner in the first vessel with the first sonication device closest to the inlet end, followed by the first agitator, which is followed by the second sonication device, and with the second agitator closest to the outlet end and following the second sonication device;
and
collecting the first material.

18. The method of claim 17, further comprising:
receiving, in a second vessel, a subset of the multi-material fluid from the first vessel through a second portion of the fluid material moving system, where in the subset comprises the first material; and
separating the first material from the subset for collection.

19. The method of claim 17, further comprising:
operating a second portion of the fluid material moving system so that the multi-material fluid moves within the first vessel while the first sonication device emits the first plurality of ultrasound waves.

20. The method of claim 17, wherein the first vessel comprises:
a first inlet disposed at the inlet end of the first vessel, wherein the multi-material fluid flows through the first inlet;
a second inlet disposed at the inlet end of the first vessel, wherein water flows through the second inlet and dilutes the multi-material fluid;
a first outlet disposed at the outlet end of the first vessel, wherein solids from the multi-material fluid flow through the first outlet; and
a second outlet disposed at the outlet end of the first vessel, wherein the second material flows through the second outlet.

* * * * *